(12) United States Patent
Homma et al.

(10) Patent No.: US 9,762,088 B2
(45) Date of Patent: Sep. 12, 2017

(54) ELECTROMAGNETIC TRANSMISSION DEVICE, POWER AMPLIFICATION DEVICE, AND ELECTROMAGNETIC TRANSMISSION SYSTEM

(71) Applicant: Mitsubishi Electric Corporation, Chiyoda-ku (JP)

(72) Inventors: Yukihiro Homma, Chiyoda-ku (JP); Jun Nishihara, Chiyoda-ku (JP); Takuro Sasaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 224 days.

(21) Appl. No.: 14/432,563

(22) PCT Filed: Oct. 1, 2013

(86) PCT No.: PCT/JP2013/005848
§ 371 (c)(1),
(2) Date: Mar. 31, 2015

(87) PCT Pub. No.: WO2014/054276
PCT Pub. Date: Apr. 10, 2014

(65) Prior Publication Data
US 2015/0280495 A1    Oct. 1, 2015

(30) Foreign Application Priority Data

Oct. 3, 2012 (JP) .................................. 2012-221503

(51) Int. Cl.
*H02J 1/10* (2006.01)
*H02J 17/00* (2006.01)
(Continued)

(52) U.S. Cl.
CPC .............. *H02J 17/00* (2013.01); *F27D 11/12* (2013.01); *G01S 7/282* (2013.01); *H01Q 3/2658* (2013.01);
(Continued)

(58) Field of Classification Search
CPC ....... F27D 11/12; G01S 7/282; H01Q 19/062; H01Q 19/102; H01Q 3/2658; H02J 17/00;
(Continued)

(56) References Cited

U.S. PATENT DOCUMENTS

2002/0011963 A1*  1/2002  Koslover ............ F41H 13/0068
                                                            343/781 P
2005/0134497 A1*  6/2005  Mafune .................. G01S 13/04
                                                              342/27
(Continued)

FOREIGN PATENT DOCUMENTS

EP    2 385 146 A1    11/2011
JP    55-12551        1/1980
(Continued)

OTHER PUBLICATIONS

Extended European Search Report dated May 24, 2016 in European Patent Application No. 13844105.0.
(Continued)

*Primary Examiner* — Carlos Amaya
*Assistant Examiner* — Esayas Yeshaw
(74) *Attorney, Agent, or Firm* — Oblon, McClelland, Maier & Neustadt, L.L.P.

(57) ABSTRACT

In order to obtain an electromagnetic transmission device and an electromagnetic transmission system that emit high-power continuous microwaves stably onto a material or an irradiation target in electromagnetic heating systems and electromagnetic power transmission systems that are required to emit electromagnetic waves such as high-power
(Continued)

microwaves, the electromagnetic transmission device, the power amplification device, and the electromagnetic transmission system emit, onto an irradiation target, electromagnetic waves that are modulated by a repeating pulse with a predetermined transmission duty cycle, or electromagnetic waves that are modulated by a repeating pulse with a predetermined transmission duty cycle and are amplified.

7 Claims, 14 Drawing Sheets

(51) Int. Cl.
| | |
|---|---|
| F27D 11/12 | (2006.01) |
| G01S 7/282 | (2006.01) |
| H01Q 3/26 | (2006.01) |
| H01Q 19/06 | (2006.01) |
| H01Q 19/10 | (2006.01) |
| H01Q 21/29 | (2006.01) |
| H05B 6/66 | (2006.01) |
| H05B 6/68 | (2006.01) |
| H05B 6/70 | (2006.01) |
| H05B 6/72 | (2006.01) |
| H05B 6/74 | (2006.01) |
| H05B 6/80 | (2006.01) |
| F27D 99/00 | (2010.01) |

(52) U.S. Cl.
CPC ......... *H01Q 19/062* (2013.01); *H01Q 19/102* (2013.01); *H01Q 21/29* (2013.01); *H05B 6/66* (2013.01); *H05B 6/68* (2013.01); *H05B 6/686* (2013.01); *H05B 6/70* (2013.01); *H05B 6/72* (2013.01); *H05B 6/74* (2013.01); *H05B 6/80* (2013.01); *F27D 2099/0028* (2013.01)

(58) Field of Classification Search
CPC . H05B 6/68; H05B 6/686; H05B 6/70; H05B 6/72; H05B 6/74; H05B 6/80; H05B 6/688; H05B 6/687
USPC .......................................................... 307/43
See application file for complete search history.

(56) References Cited

U.S. PATENT DOCUMENTS

| | | | | |
|---|---|---|---|---|
| 2007/0157730 A1* | 7/2007 | Ochiai | ........... | F22B 37/003 73/627 |
| 2009/0026195 A1* | 1/2009 | Miyake | ........... | H05B 6/76 219/756 |
| 2011/0168695 A1* | 7/2011 | Okajima | ........... | H05B 6/686 219/647 |
| 2012/0103975 A1* | 5/2012 | Okajima | ........... | H05B 6/6447 219/660 |
| 2013/0062334 A1* | 3/2013 | Bilchinsky | ........... | H05B 6/705 219/482 |
| 2013/0142923 A1* | 6/2013 | Torres | ........... | H05B 6/705 426/233 |
| 2013/0313250 A1* | 11/2013 | Ibragimov | ........... | H05B 6/6447 219/709 |
| 2014/0153592 A1* | 6/2014 | Nishikata | ........... | H01S 3/0903 372/2 |

FOREIGN PATENT DOCUMENTS

| | | |
|---|---|---|
| JP | 56-132793 | 10/1981 |
| JP | 60-37341 | 3/1985 |
| JP | 2-104103 A | 4/1990 |
| JP | 3-97196 U | 10/1991 |
| JP | 5-89957 A | 4/1993 |
| JP | 5-90885 | 12/1993 |
| JP | 2001-299938 | 10/2001 |
| JP | 2001-308649 | 11/2001 |
| JP | 2009-259511 | 11/2009 |
| JP | 2010-272913 | 12/2010 |
| WO | WO 00/14572 A1 | 3/2000 |
| WO | 2010/087464 A1 | 8/2010 |

OTHER PUBLICATIONS

Office Action dated Aug. 16, 2016 in Korean Patent Application No. 10-2015-7008660 (with English language translation).

Office Action dated Oct. 27, 2015 in Japanese Patent Application No. 2014-539613 (with partial English translation).

Motoyasu Sato et al., "Conceptual Design of microwave Applicators with Phased Arry Antennas for Industries", the 5th Japan Society of Electromagnetic Wave Energy Applications Symposium, Collected Presentations Abstract 2B07, pp. 98-99, (2011).

International Search Report dated Dec. 3, 2013 in PCT/JP13/005848 Filed Oct. 1, 2013.

Combined Chinese Office Action and Search Report dated Oct. 10, 2015 in Patent Application No. 201380051708.3 with partial English translation and English translation of categories of cited documents.

* cited by examiner

ELECTROMAGNETIC TRANSMISSION DEVICE, POWER AMPLIFICATION DEVICE, AND ELECTROMAGNETIC TRANSMISSION SYSTEM

TECHNICAL FIELD

The present disclosure relates to an electromagnetic transmission device, a power amplification device, and an electromagnetic transmission system for use in systems that transmit and direct electromagnetic waves such as microwaves onto a predetermined position to perform irradiation for heating, chemical change, and/or power transmission purposes.

BACKGROUND ART

Electromagnetic transmission devices and electromagnetic transmission systems are used in microwave heating furnaces including microwave reaction furnaces, microwave smelting furnaces, microwave refining furnaces, microwave melting furnaces, microwave blast furnaces, microwave sintering furnaces, and the like, and microwave power transmission systems. For example, in microwave heating and microwave power transmission systems such as experimental devices for space solar power systems, it is required that electromagnetic transmission devices output high-power microwaves. Hence, electron-tube amplifiers such as magnetrons or klystrons characterized by high-power output have been used in microwave transmission devices of these systems for a long time.

Meanwhile, with recent advances in semiconductor amplifier technologies in the fields of radars or telecommunication equipment, progress is being made in developing high-power microwave semiconductor amplifiers that can output, for example, approximately several tens of watts to 200 W in the C-band. Microwave transmission devices such as active phased array antennas (APAAs) equipped with these amplifiers achieve systems that can be enlarged in scale and/or increased in output power.

CITATION LIST

Patent Literature

Patent Literature 1: International Publication No. WO2010/087464
Patent Literature 2: Unexamined Japanese Patent Application Kokai Publication No. 2001-308649
Patent Literature 3: Unexamined Japanese Patent Application Kokai Publication No. H2-104103
Patent Literature 4: Unexamined Japanese Patent Application Kokai Publication No. 2010-272913

Non Patent Literature

Non-Patent Literature 1: Motoyasu Sato et al., the 5th Japan Society of Electromagnetic Wave Energy Applications Symposium, Collected Presentation Abstracts 2B07 (2011) pp. 98-99.

SUMMARY OF INVENTION

Technical Problem

Patent Literature 1 describes a microwave heat smelting furnace (microwave heating furnace) that is provided with microwave irradiation windows and that uses a microwave irradiation device to emit microwaves, the microwave irradiation device being disposed to the exterior of the furnace and capable of varying beam directions electrically by controlling wave fronts and phases of microwaves. Patent Literature 1 describes emitting microwaves with a high power flux density to melt materials such as iron ores that are fed into a microwave irradiation chamber, thereby manufacturing iron and the like. Patent Literature 1, however, has a problem in that a high power flux density is difficult to obtain in the microwave irradiation chamber because Patent Literature 1 does not describe any specific configuration, lay-out, or the like of the microwave irradiation device for obtaining a high power flux density in the microwave irradiation chamber. Further, Patent Literature 1 has another problem in that scaling up the system is difficult because Patent Literature 1 does not describe a method for increasing the output and irradiation power of microwaves so as to enable greater-scale microwave heating and microwave power transmission systems such as experimental devices for space solar power systems. For example, no specific method for achieving enlargement in scale and/or increase in output power, such as equipping a single system with additional microwave transmission devices, is described.

Non-Patent Literature 1 proposes a system in which phased array antennas are arranged along the outer periphery of a furnace, and microwaves are emitted and then reflected by reflection mirrors into a microwave irradiation chamber where a material is disposed. In such a system, a high-power continuous-microwave irradiation device capable of outputting several hundred watts of microwaves is required for each phased array antenna element. However, Non-Patent Literature 1 does not disclose a specific method for implementing a high-power continuous-microwave irradiation device. Hence, matters described in Non-Patent Literature 1 have a problem concerning, for example, a semiconductor amplifier that uses a gallium nitride (GaN) element. That is, Non-Patent Literature 1 has a problem in that, in case of outputting approximately one hundred or more watts of high-power continuous waves, the semiconductor amplifier cannot radiate heat sufficiently, thereby hindering a stable emission of power because of gain reduction resulting from temperature increase, burnout, or the like.

Patent Literature 2 discloses a power amplification device for use in communication via a time division multiple access (TDMA) scheme. To prevent an increase in the junction temperature (Tj) of output-stage transistors of output-stage amplifiers in the power amplification device during a transmission period, the power amplification device is designed as a high-frequency power amplification device in which the output-stage amplifiers operate sequentially every pulse width for a predetermined transmission time period, the duty cycle of the pulse being the reciprocal of the number of output-stage amplifiers. However, no description can be found regarding a high-frequency power amplifier that can output continuous waves.

An objective of the present disclosure is to solve the foregoing problems, that is, to obtain an electromagnetic transmission device, a power amplification device, and an electromagnetic transmission system for emitting high-power continuous microwaves stably onto an irradiation target, such as a material or a power receiver. The electromagnetic transmission device, the power amplification device, and the electromagnetic transmission system are suitable for electromagnetic heating systems, electromagnetic power transmission systems, and the like that are required to emit electromagnetic waves such as high-power microwaves.

Solution to Problem

An electromagnetic transmission device, a power amplification device, and an electromagnetic power transmission system according to the present disclosure emit, onto an irradiation target, electromagnetic waves that are modulated by a repeating pulse with a predetermined transmission duty cycle, or electromagnetic waves that are modulated by a repeating pulse with a predetermined transmission duty cycle and are amplified. The electromagnetic waves are pulse-modulated at mutually different transmission timings. A time interval between adjacent transmission timings of the mutually different transmission timings is a transmission time corresponding to the predetermined transmission duty cycle.

Advantageous Effects of Invention

The present disclosure has an advantageous effect of emitting high-power microwaves that are equivalent to continuous waves stably and efficiently onto an intended position. The present disclosure also has an advantageous effect of obtaining an electromagnetic transmission device, a power amplification device, and an electromagnetic transmission system that are highly-extensible and can be enlarged in scale and/or increased in output power.

DESCRIPTION OF EMBODIMENTS

Embodiment 1

Figure 1:
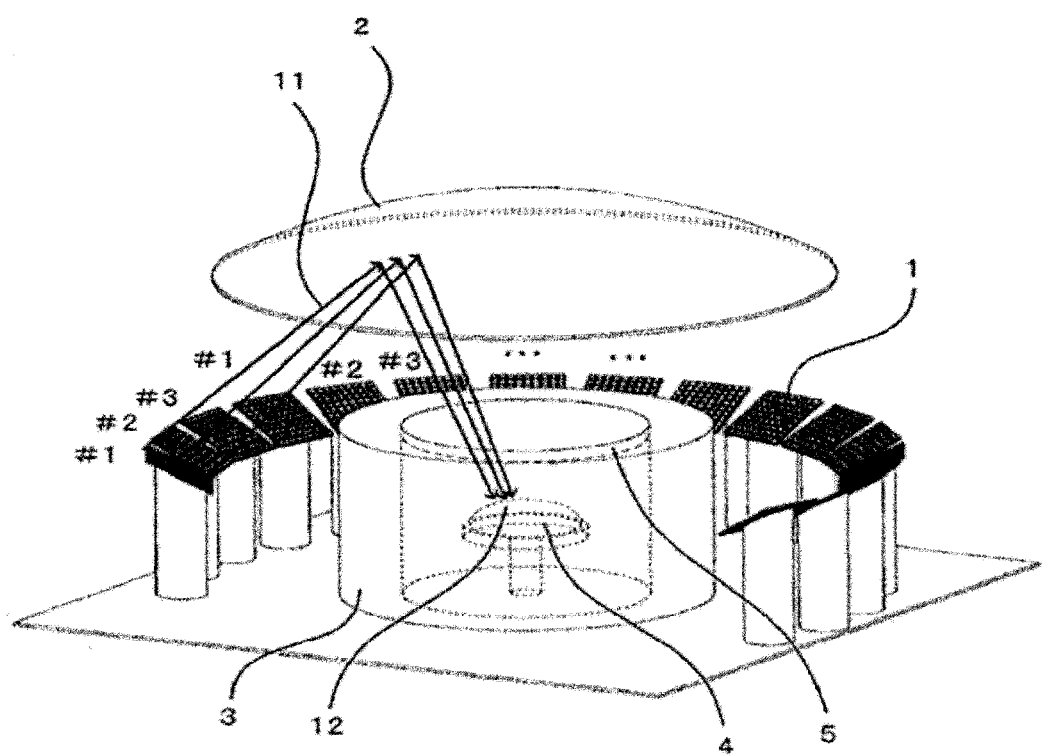
FIG. 1 is a diagram illustrating the configuration of a microwave heating furnace (microwave smelting furnace) to which an electromagnetic transmission device and an electromagnetic transmission system according to Embodiment 1 of the present disclosure are applicable.

FIG. 1 is a diagram illustrating the configuration of a microwave heating furnace (microwave smelting furnace) to which an electromagnetic transmission device and an electromagnetic transmission system according to Embodiment 1 are applicable. In FIG. 1, electromagnetic transmitters 1 (microwave transmitters 1) are each constituted by an APAA or the like that transmits transmission microwaves 11. A reflection plate 2 reflects the transmission microwaves 11. A heating furnace 3 includes a focal portion 4 and a material 12 (irradiation target 12), and produces iron or the like. The focal portion 4 is a portion that corresponds to a focal point where the transmission microwaves 11 transmitted by the microwave transmitters 1 converge. A window 5 is disposed at a top portion of the heating furnace 3 and enables the transmission microwaves 11 to pass therethrough. The material 12 is retained at the focal portion 4 and is a target to be heated by the transmission microwaves 11. The focal portion 4 is constituted by a table or a crucible for retaining the material 12 near the focal point. The table or the crucible may also be referred to as an irradiation-target retainer for retaining the material 12, that is, the irradiation target, or as an irradiation-target mount for mounting the material 12. In the figure, the same reference numerals denote the same or corresponding elements, details of which are not explained herein.

Further, in FIG. 1, the heating furnace 3 is provided with the window 5 at a top portion upon which the transmission microwaves 11 are incident, so as to prevent the material 12, exhaust gas, heat, the transmission microwaves 11, and/or the like from leaking out of the heating furnace 3. In FIG. 1, the interior of the heating furnace 3 is indicated by dotted lines to show the structures of the focal portion 4, (a part of) the window 5, the material 12, and the table (irradiation-target retainer) that are disposed in the interior of the heating furnace 3. The electromagnetic transmission system according to Embodiment 1 includes an irradiation-target retainer that retains an irradiation target irradiated with electromagnetic waves from the electromagnetic transmitters 1, in addition to the electromagnetic transmitters 1 (microwave transmitters 1) of the electromagnetic transmission device according to Embodiment 1. In the figure, the same reference numerals denote the same or corresponding elements, details of which are not explained herein.

Basic operations in the electromagnetic transmission device and the electromagnetic transmission system according to Embodiment 1 are explained below. The transmission microwaves 11 emitted from the microwave transmitters 1 are reflected by the reflection mirror 2, pass through the window 5 provided at the top portion of the heating furnace 3, and irradiate the material 12 retained near the focal portion 4. At this time, with beam direction control and/or beam formation by the APAAs and the optical system of the reflection plate, the transmission microwaves 11 emitted from each of the transmission microwave transmitters 1 are controlled such that the power flux density thereof becomes stronger near the focal portion 4. When the electromagnetic transmission device (electromagnetic transmission system) according to Embodiment 1 is applied to a microwave heating furnace (microwave smelting furnace), the material 12 (irradiation target 12) is supported by the irradiation-target retainer at the focal portion 4. On the other hand, when the electromagnetic transmission device (electromagnetic transmission system) according to Embodiment 1 is applied to a microwave power transmission system, a power receiving device 12 (irradiation target 12) is supported by the irradiation-target retainer at the focal portion 4. The power receiving device 12 receives electromagnetic waves and converts the received electromagnetic waves into power.

Here, supplementary explanation is given for a case where the electromagnetic transmission device (electromagnetic transmission system) according to Embodiment 1 is applied to a microwave heating furnace (microwave smelting furnace), with reference to the microwave heating furnace (microwave smelting furnace) shown in FIG. 1. As shown in FIG. 1, the material 12, that is, an irradiation target is accommodated in a position corresponding to the focal portion 4 in the heating furnace 3 of the microwave heating furnace (microwave smelting furnace). To provide heating and/or smelting by electromagnetic waves emitted from the microwave transmitters 1 (electromagnetic transmitters), the heating furnace 3 is provided with the window 5 that enables electromagnetic waves to pass therethrough and traps substances generated by heating and/or smelting. The focal portion 4 is disposed within the heating furnace 3, that is, the interior of the window 5.

Also, in the microwave heating furnace (microwave smelting furnace) shown in FIG. 1, the microwave transmitters 1 are arranged in an annular pattern surrounding the heating furnace 3. Further, the reflection mirror 2 for reflecting and collecting electromagnetic waves is provided in electromagnetic-wave irradiation paths from the microwave transmitters 1 to the heating furnace 3 (window 5). The arrangement of the microwave transmitters 1 and the electromagnetic wave paths from the microwave transmitters 1 to the heating furnace 3 (window 5) are not limited to those shown in FIG. 1. FIG. 1 schematically illustrates that microwave transmitters 1 are arranged in combinations of #1, #2, and #3 and in an annular pattern surrounding the heating furnace 3. Some of the microwave transmitters 1 arranged in the annular pattern are not shown so that the appearance and interior of the heating furnace 3 are visible.

Figure 2:
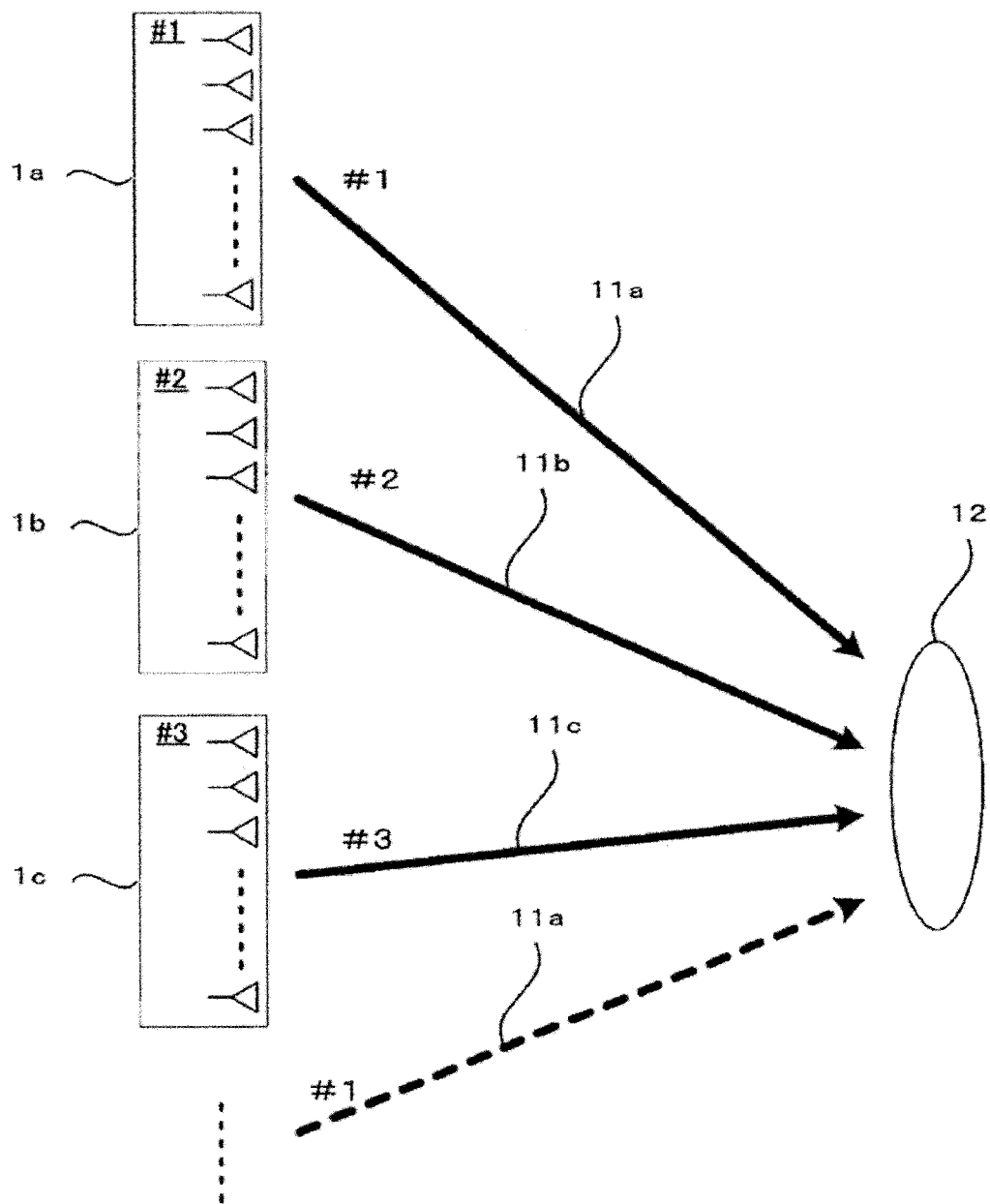
FIG. 2 is an image diagram illustrating operations of microwave transmitters (electromagnetic transmitters) of the electromagnetic transmission device and the electromagnetic transmission system according to Embodiment 1 of the present disclosure.
Figure 3:
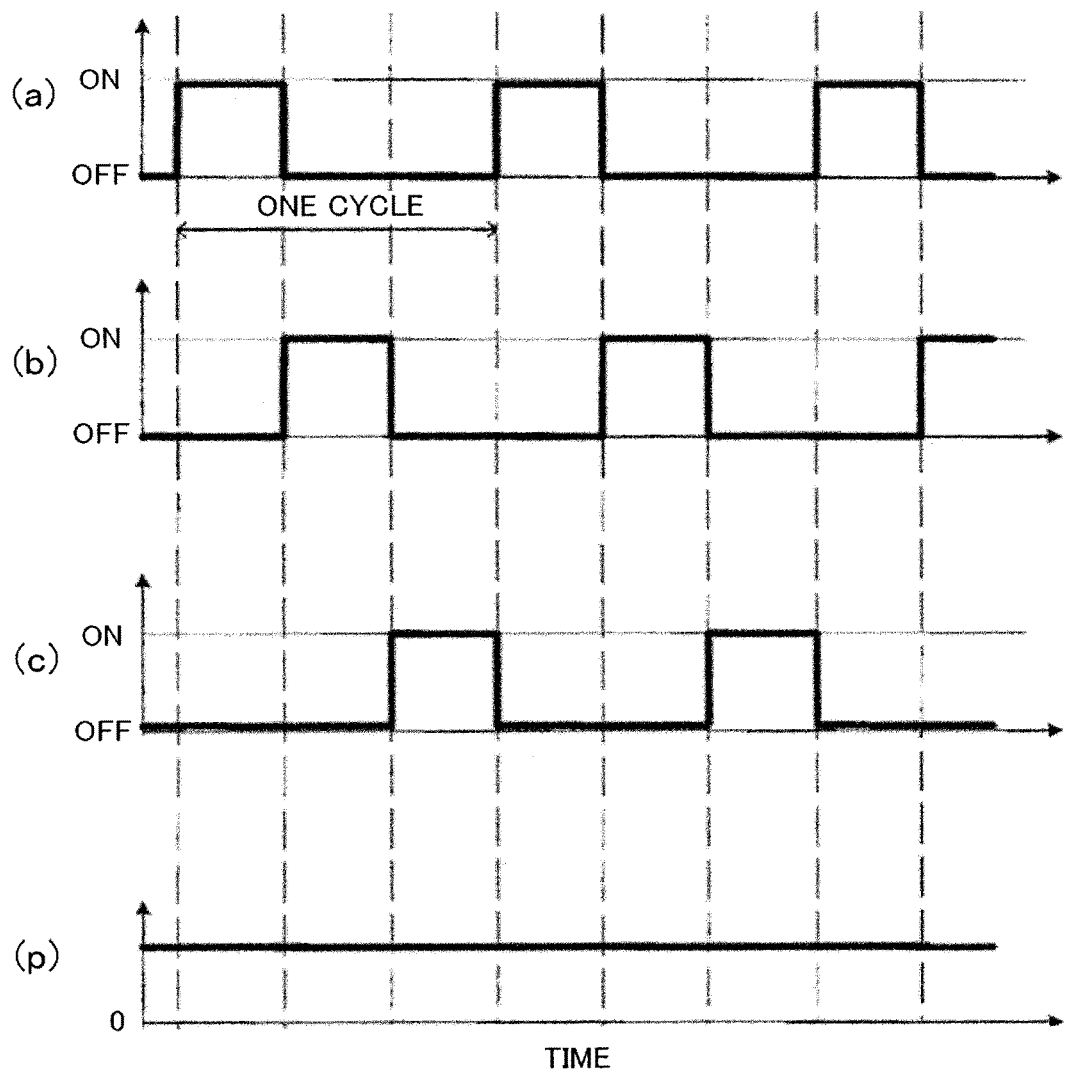
FIG. 3 is a graph illustrating the output power of the microwave transmitters (electromagnetic transmitters) of the electromagnetic transmission device and the electromagnetic transmission system according to Embodiment 1 of the present disclosure.

With reference to FIGS. 2 and 3, explanation is given for operations that are performed when pulse-output microwave transmitters 1 according to Embodiment 1 are used. The microwave transmitters 1a, 1b, 1c . . . correspond to the microwave transmitters 1 such as APAAs. The microwave transmitters 1a, 1b, and 1c correspond to the microwave transmitters 1 denoted in FIG. 1 as #1, #2, and #3, respectively. The microwave transmitters 1a, 1b, 1c . . . transmit pulsed transmission microwaves 11a, 11b, and 11c, respectively, at mutually different transmission timings toward the material 12, which is disposed at the focal portion. First, to simplify explanation, an example case is described assuming that three microwave transmitters 1, that is, 1a, 1b, and 1c are used and the transmission duty cycle of the transmission microwaves 11 is 33.3%. In this example, microwaves are transmitted as shown in FIG. 3 by controlling transmission timings at which the microwave transmitters 1 transmit the transmission microwaves 11. The transmission duty cycle is the ratio of a transmission time to one-cycle time, where the one-cycle time consists of a transmission time and a non-transmission time of pulse-modulated transmission microwaves. For example, the transmission duty cycle is the ratio of an ON time to one cycle shown in the below-described timeline (a) of FIG. 3. Further, the transmission timing is a time (timing) when the non-transmission time is switched to the transmission time for the pulse-modulated transmission microwaves having the transmission time and the non-transmission time. In the figure, the same reference numerals denote the same or corresponding elements, details of which are not explained herein.

In the graph shown in FIG. 3, the vertical axes of timelines (a), (b), and (c) indicate ON/OFF state of the microwave transmitters 1, and the horizontal axes indicate time. That is, the timelines (a), (b), and (c) illustrate transmission timings of the microwave transmitters 1. In order from top to bottom, the timeline (a) illustrates the waveform of transmission microwaves emitted from the microwave transmitter 1a, indicating output from the microwave transmitter 1a; the timeline (b) illustrates the waveform of transmission microwaves emitted from the microwave transmitter 1b, indicating output from the microwave transmitter 1b; the timeline (c) illustrates the waveform of transmission microwaves emitted from the microwave transmitter 1c, indicating output from the microwave transmitter 1c; and a timeline (p), positioned at the bottom, illustrates the power flux density of combined transmission microwaves obtained near the material 12. The vertical axis of the timeline (p) indicates the power flux density of the combined transmission microwaves, and the horizontal axis indicates time.

As shown in the timelines (a), (b), and (c) of FIG. 3, microwave transmitters 1 (microwave transmitters 1a, 1b, and 1c) transmit pulsed waves onto the material 12 (irradiation target 12) repeatedly at transmission timings that are mutually different and are shifted (delayed) sequentially by ⅓ of one cycle. In other words, the microwave transmitters 1 may be said to be pulse-driven at mutually different transmission timings. Further, a time interval between mutually different transmission timings of adjacent microwave transmitters 1 may be said to be a transmission time corresponding to a predetermined transmission duty cycle. The electromagnetic transmission device (electromagnetic transmission system) according to Embodiment 1 may include a control circuit 30 therein and pulse-drive each of the electromagnetic transmitters 1 via the control circuit 30. That is, the control circuit 30 delays the transmission timings of the microwave transmitters 1 sequentially by the transmission time corresponding to the predetermined transmission duty cycle. Details of the control circuit 30 are described later.

The predetermined transmission duty cycle is defined as 1/(the number of microwave transmitters 1 to be pulse-driven at mutually different transmission timings). Among the microwave transmitters 1 shown in FIGS. 1 to 3, the targets to be pulse-driven at mutually different transmission timings are three microwave transmitters, 1a, 1b, and 1c, and thus the predetermined transmission duty cycle is ⅓. As such, each of the microwave transmitters 1 emits onto the irradiation target 12 (material 12) electromagnetic waves that are modulated by a repeating pulse with a predetermined transmission duty cycle, so that the power flux density obtained near the material 12 is equivalent to the one obtained through emission of the continuous microwaves as shown in the bottom of FIG. 3, that is, the timeline (p) of FIG. 3.

To obtain a high power flux density at the material 12 (the focal portion 4) in the microwave heating furnace (microwave smelting furnace), the number of microwave transmitters 1 is increased in increments of three, and electromagnetic emission timings are shifted relative to one another by ⅓ of one cycle, similar to the above. This enables a high power flux density equivalent to that of continuous waves. For example, in the case of the microwave transmitters 1 in the microwave heating furnace (electromagnetic transmission system) shown in FIG. 1, the microwave transmitters, which are arranged in the order of #1, #2 and #3 and #1, #2 . . . along the circumferential direction of the heating furnace 3, transmit electromagnetic waves at sequential transmission timings. These transmission timings are the timings when the microwave transmitters 1 are switched to ON-state as indicated in the vertical axes of the timelines (a), (b) and (c) of FIG. 3.

If the optical path length from each of the microwave transmitters 1 to the material 12 differs among the microwave transmitters 1, or if there is any passing phase difference within the system, the element electric field vector method as disclosed in Patent Literature 3, for example, can be used to measure, detect, and correct phase errors and/or passing phase errors among the transmission microwaves 11 so that the phases match one another at the material portion (focal portion 4). Thus, the power flux density obtained near the material 12 is equivalent to the one obtained through emission of coherent and continuous microwaves. Furthermore, adjusting phases and/or amplitudes of the transmission microwaves 11 output from each of the microwave transmitters 1 enables beams of power-transmission microwaves to be shaped with freedom.

Figure 4:
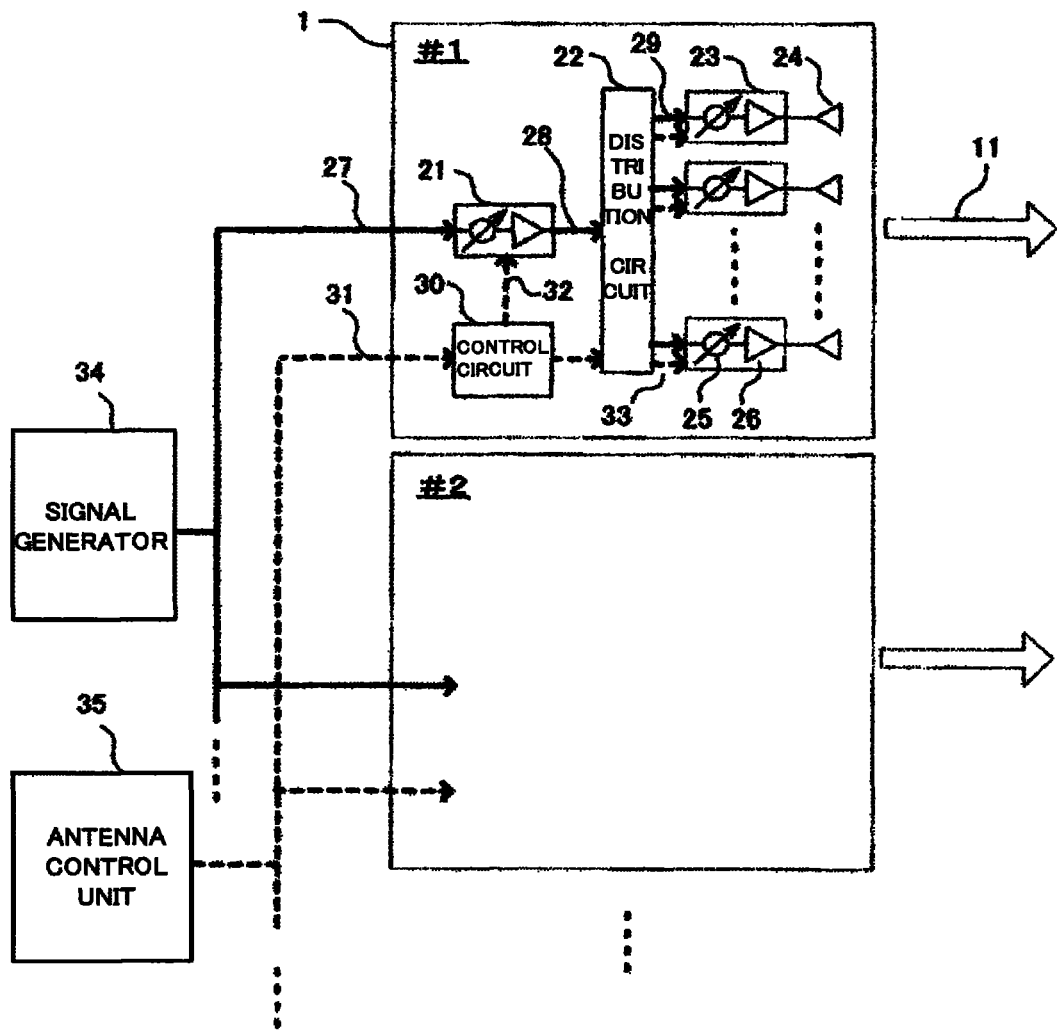
FIG. 4 is a system block diagram illustrating microwave transmitters (electromagnetic transmitters) of the electromagnetic transmission device and the electromagnetic transmission system according to Embodiment 1 of the present disclosure.

FIG. 4 is a system block diagram illustrating a microwave transmitter using an APAA in the microwave heating furnace (microwave smelting furnace) in the electromagnetic transmission device and the electromagnetic transmission system according to Embodiment 1, and the vicinity of the microwave transmitter 1. In FIG. 4, a first-stage high power amplifier (HPA) module 21 (first-stage HPA module 21) is disposed in the interior of the microwave transmitter 1 (electromagnetic transmitter 1). A distribution circuit 22 distributes microwaves from the first-stage HPA module 21 and last-stage HPA module control signals 33. Last-stage high power amplifier (HPA) modules 23 (last-stage HPA modules 23, power amplification devices 23) are provided within the microwave transmitter 1, each of which is connected to the distribution circuit 22. Antennas 24 transmit microwaves and are connected to the respective last-stage HPA modules 23. A phase shifter 25 and an HPA 26 (power amplifier 26) are built in the first-stage HPA module 21 and the last-stage HPA modules 23. In the figure, the same reference numerals denote the same or corresponding elements, details of which are not explained herein.

In FIG. 4, a control circuit 30 is constituted by a CPU, an FPGA, and/or the like. A signal generator 34 generates a source oscillation signal 27, which serves as the basis of electromagnetic waves to be emitted (transmitted) onto the irradiation target 12. The signal generator 34 then supplies the source oscillation signal 27 to the first-stage HPA module 21. An antenna control unit 35 controls each of the microwave transmitters 1 in an integrated manner, and transmits a microwave-transmitter control signal 31 to the control circuit 30 included in each of the microwave transmitters 1. The control circuit 30 transmits a first-stage HPA module control signal 32 to the first-stage HPA module 21 based on the microwave-transmitter control signal 31. Likewise, the control circuit 30 transmits the last-stage HPA module control signals 33 to the last-stage HPA modules 23 via the distribution circuit 22, based on the microwave-transmitter control signal 31. In the figure, the same reference numerals denote the same or corresponding elements, details of which are not explained herein.

In the electromagnetic transmission device and electromagnetic transmission system according to Embodiment 1 that are shown in FIG. 4, control circuits 30 formed in the respective microwave transmitters 1 each receive a microwave-transmitter control signal 31 from the antenna control unit 35. Upon receiving the control signal 31, the control circuits 30 perform an operation for delaying the transmission timings of the corresponding microwave transmitters 1 sequentially by the transmission time corresponding to the predetermined transmission duty cycle.

That is, the control circuit 30 transmits the first-stage HPA module control signal 32 and the last-stage HPA module control signal 33, thereby controlling the first-stage HPA module 21 and the last-stage HPA modules 23. With this control by each of control circuits 30, the transmission timings of the microwave transmitters 1 are delayed sequentially by the transmission time corresponding to the predetermined transmission duty cycle. Hence, the control circuit in the electromagnetic transmission device (electromagnetic transmission system) may be said to be each of the control circuits 30, but the control circuit in the electromagnetic transmission device (electromagnetic transmission system) may also include the antenna control unit 35 in addition to the control circuits 30. Needless to say, the antenna control unit 35 may be employed alone as the control circuit.

As described above, the electromagnetic transmission device (electromagnetic transmission system) according to Embodiment 1 is applicable even when, for example, a high power flux density of the transmission microwaves 11 is required at the focal portion 4 of the microwave heating furnace (microwave smelting furnace) shown in FIG. 1. That is, the pulse-output microwave transmitters 1 undergo switch control to transmit transmission microwaves 11 at shifted transmission timings, thereby emitting continuous transmission microwaves 11 to near the focal portion 4 efficiently, and enabling a control for increasing the power flux density. More specifically, in the microwave heating furnace (microwave smelting furnace) shown in FIG. 1, continuous transmission microwaves 11 are emitted to near the focal portion 4 efficiently due to the beam direction control and/or beam formation by APAAs as well as the reflection plate 2.

The foregoing explains that the microwave transmitters 1 in the electromagnetic transmission device (electromagnetic transmission system) according to Embodiment 1 are pulse-driven at mutually different transmission timings. Hereinafter, explanation is given for a case where a plurality of sets is used, each set consisting of a plurality of microwave transmitters 1. In the foregoing description, a plurality of sets, each set consisting of three microwave transmitters 1 shown in FIG. 1, is used, and all of the microwave transmitters 1 are pulse-driven at mutually different transmission timings. In the below-described electromagnetic transmission device (electromagnetic transmission system) according to Embodiment 1, a plurality of sets, each set consisting of a plurality of microwave transmitters 1, is used, and only the microwave transmitters 1 in the same set are pulse-driven at mutually different transmission timings. Additionally, one microwave transmitter 1 included in one set and one microwave transmitter 1 included in another set are pulse-driven at the same transmission timing so that two microwave transmitters 1 emit (transmit) electromagnetic waves (transmission microwaves 11) onto the irradiation target 12. This enables an even higher power flux density to be obtained near the focal portion 4.

More specifically, a plurality of electromagnetic transmission units, each unit including a plurality of microwave transmitters 1, is employed. In this configuration, for each electromagnetic transmission unit, the control device 30 (the antenna control unit 35) sequentially delays the transmission timings of the microwave transmitters 1 in each of the electromagnetic transmission units by a transmission time corresponding to a predetermined transmission duty cycle. The control device 30 also performs control such that any one of the microwave transmitters included in one electromagnetic transmission unit operates at the same transmission timing as any one of the microwave transmitters 1 included in another electromagnetic transmission unit. In this case as well, the predetermined transmission duty cycle is defined by 1/(the number of microwave transmitters 1 to be pulse-driven at mutually different timings).

Explanation is given for a case where the microwave transmitters 1 are arrayed as shown in FIG. 1. The symbol "#" used herein simply refers to the microwave transmitters 1 appended with this symbol in FIG. 1, and does not refer to those having no "#" appended. In the arrangement as shown in FIG. 1, each of the electromagnetic transmission units may be said to have three microwave transmitters 1 (microwave transmitters 1a, 1b, and 1c). Any one of the three microwave transmitters 1 (for example, #1, #2, and #3 microwave transmitters 1 in order from left to right in FIG. 1) included in an electromagnetic transmission unit may be said to operate at the same transmission timing as any one of the three microwave transmitters 1 (for example, #3, #2, and #1 microwave transmitters 1 in order from right to left in FIG. 1) included in another electromagnetic transmission unit.

In this case as well, among the microwave transmitters 1, the targets to be pulse-driven at mutually different timings are three microwave transmitters in each set, that is, #1, #2, and #3 microwave transmitters 1 in order from left to right in FIG. 1, and #3, #2, and #1 microwave transmitters 1 in order from right to left in FIG. 1. Thus, the predetermined transmission duty cycle for each microwave transmitter is 1/3.

Even in such a case where microwave transmitters 1 in the same set are controlled to have mutually different transmission timings while microwave transmitters 1 in different sets are controlled to have the same transmission timing so that two microwave transmitters 1 emit (transmit) electromagnetic waves (transmission microwaves 11) onto the irradiation target 12, basic operations of the control device 30 are as below. That is, the control device 30 (antenna control unit 35) performs phase control for each of the microwave transmitters 1 included in each of the electromagnetic transmission units so that electromagnetic waves transmitted from the electromagnetic transmission units are in phase with one another on the irradiation target 12. The control device 30 (the antenna control unit 35) controls directional properties of electromagnetic waves from each of the microwave transmitters 1 included in each of the electromagnetic transmission units so that electromagnetic waves transmitted from the electromagnetic transmission units converge on the irradiation target 12.

Furthermore, the electromagnetic transmission device (electromagnetic transmission system) according to Embodiment 1 controls the transmission timings and/or switching timings of the microwave transmitters 1 by the antenna control unit 35 and/or the control circuit 30 using software and/or an FPGA, according to pulse length and transmission duty cycle. Hence, the electromagnetic transmission device (electromagnetic transmission system) according to Embodiment 1 has an advantageous effect of emitting continuous transmission microwaves 11 to near the focal portion 4 efficiently, and enabling a control for increasing the power flux density, with no need to introduce any special hardware in addition to the normal hardware of microwave transmission systems and APAAs.

Further, in general APAAs, ON/OFF control signals that are input to the first-stage HPA modules 21 and to the last-stage HPA modules 23 for switching microwave transmission can be controlled immediately (not more than one μ second), by inputting high/low and the like control signals to each of the modules. Hence, the electromagnetic transmission device (electromagnetic transmission system) according to Embodiment 1 is able to switch the pulse-wave transmission timings of the microwave transmitters 1 as well as each of the microwave transmitters 1 at a proper timing.

Some systems require no amplification to be performed at the first stage, or have the phase shifter 25 of the last-stage HPA module 23 that can perform phase correction and adjustment and/or the like, in substitution for the phase shifter 25 of the first-stage HPA module 21. In such cases, the first-stage HPA module 21, or the HPA 26 and the phase shifter 25 within the first-stage HPA module 21 may be omitted.

Further, the control circuit 30 may be omitted if the processing of the control circuit 30 is performed by the antenna control unit 35 or the like. Conversely, the signal generator 34 may be omitted if RFICs or the like equipped with transmitters as disclosed in Patent Literature 4 are built in the microwave transmitters 1 or the first-stage HPA modules 21 to achieve synchronization via the antenna control unit 35.

Still further, the power of the source oscillation signal generated by the signal generator 34 is reduced by switching the traveling path of the source oscillation signal 27 generated by the signal generator 34 in synchronization with the switching of each of the microwave transmitters 1.

In the example of Embodiment 1, three microwave transmitters 1 are pulse-driven at mutually different timings, but the number of such microwave transmitters 1 may be two, or four or more. In that case, the microwave transmitters 1 transmit microwaves repeatedly at transmission timings that are shifted (delayed) sequentially by 1/(the number of microwave transmitters 1) of one cycle. That is, the predetermined transmission duty cycle is 1/(the number of microwave transmitters 1). Further, Embodiment 1 also includes a case where microwave transmitters 1 in the same set are controlled to have mutually different transmission timings while microwave transmitters 1 in different sets are controlled to have the same transmission timing so that two microwave transmitters 1 emit (transmit) electromagnetic waves (transmission microwaves 11) onto the irradiation target 12. Based on such interpretation, the microwave transmitters 1 may be said to transmit microwaves repeatedly at transmission timings that are shifted (delayed) sequentially by 1/(the number of microwave transmitters 1 to be pulse-driven at mutually different timings) of one cycle, as described above. In other words, the predetermined transmission duty cycle may be said to be 1/(the number of microwave transmitters 1 to be pulse-driven at mutually different timings).

Embodiment 2

First, differences between Embodiment 2 and Embodiment 1 are explained. In embodiment 1, the transmission microwaves 11 that are equivalent to high-power continuous waves are generated near a material 12 by adjusting the beam emission timing for each microwave transmitter 1 that includes a plurality of last-stage HPA modules 23, as shown in FIGS. 2 and 4. In contrast, in Embodiment 2, a plurality of HPAs 26 is included in a last-stage HPA module 23 and is switched within the last-stage HPA module 23 to transmit microwaves, so that transmission microwaves 11 that are equivalent to high-power continuous waves are obtained at the output part of the last-stage HPA module 23. The last-stage HPA module 23 corresponds to a power amplification device (power amplification device 23) according to Embodiment 2.

Hence, the power amplification device according to Embodiment 2 is a power amplification device that amplifies electromagnetic waves in electromagnetic transmitters 1 of the electromagnetic transmission device according to Embodiment 2. Further, the electromagnetic transmission system according to Embodiment 2 is an electromagnetic transmission system that includes, in addition to the electromagnetic transmitters 1 (microwave transmitters 1) of the electromagnetic transmission device according to Embodiment 2, an irradiation-target retainer for retaining an irradiation target to be irradiated with electromagnetic waves from the electromagnetic transmitters 1.

Figure 5:
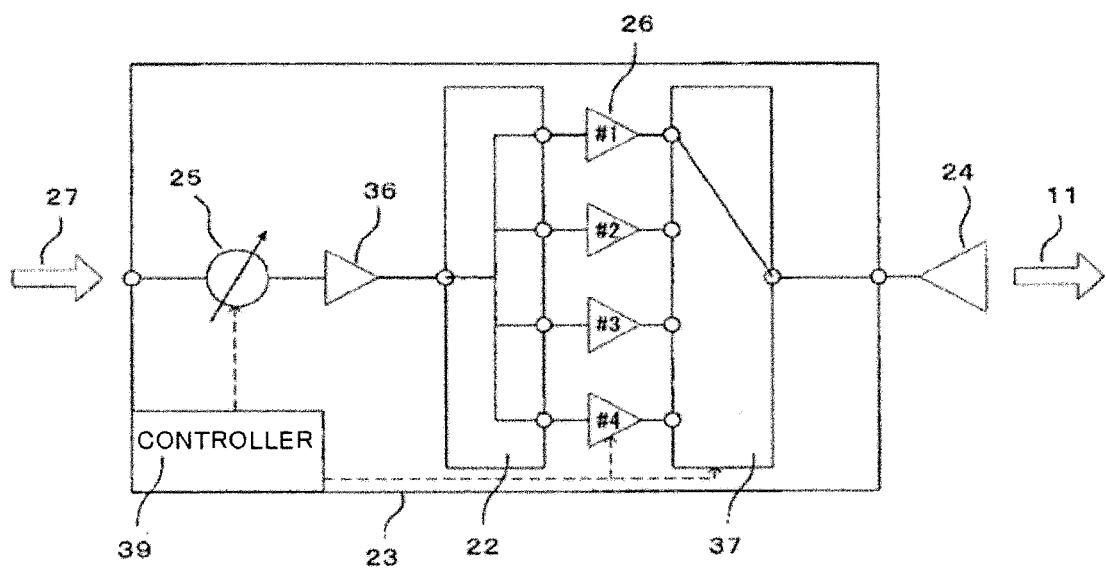
FIG. 5 is a block diagram illustrating a power amplification device according to Embodiment 2 of the present disclosure.

FIG. 5 is a block diagram illustrating the configuration of the last-stage HPA module 23, that is, the power amplification device according to Embodiment 2. In FIG. 5, a pre-amplifier 36 amplifies microwaves to a certain level. A distribution circuit 22 (distributor 22) distributes microwaves amplified by the pre-amplifier 36. The HPAs 26 amplify the microwaves distributed by a distribution circuit 22 to produce high-power microwaves. A switching circuit 37 (output-side switch 37) switches the outputs of the HPAs 26 and transmits the microwaves. These elements are packaged together as the last-stage HPA module 23. In the figure, the same reference numerals denote the same or corresponding elements, details of which are not explained herein.

Once a source oscillation signal 27 is input to the last-stage HPA module 23, a phase shifter 25 performs phase adjusting for beam direction control, beam formation, and phase error correction among the HPAs 26. Then, microwaves are amplified by the pre-amplifier 36 and the HPAs 26. The switching circuit 37 switches the outputs of the HPAs 26 and transmits the microwaves to an antenna 24. The antenna 24 transmits continuous transmission microwaves 11. Control signals for controlling the phase shifter 25, the HPAs 26, and the switching circuit 37 are supplied from the exterior of the last-stage HPA module 23 directly, or from a controller 39 within the last-stage HPA module 23. When the control signals are supplied from the exterior, an antenna control unit corresponding to the antenna control unit 35 as explained in Embodiment 1 is required. In the figure, the same reference numerals denote the same or corresponding elements, details of which are not explained herein.

Figure 6:
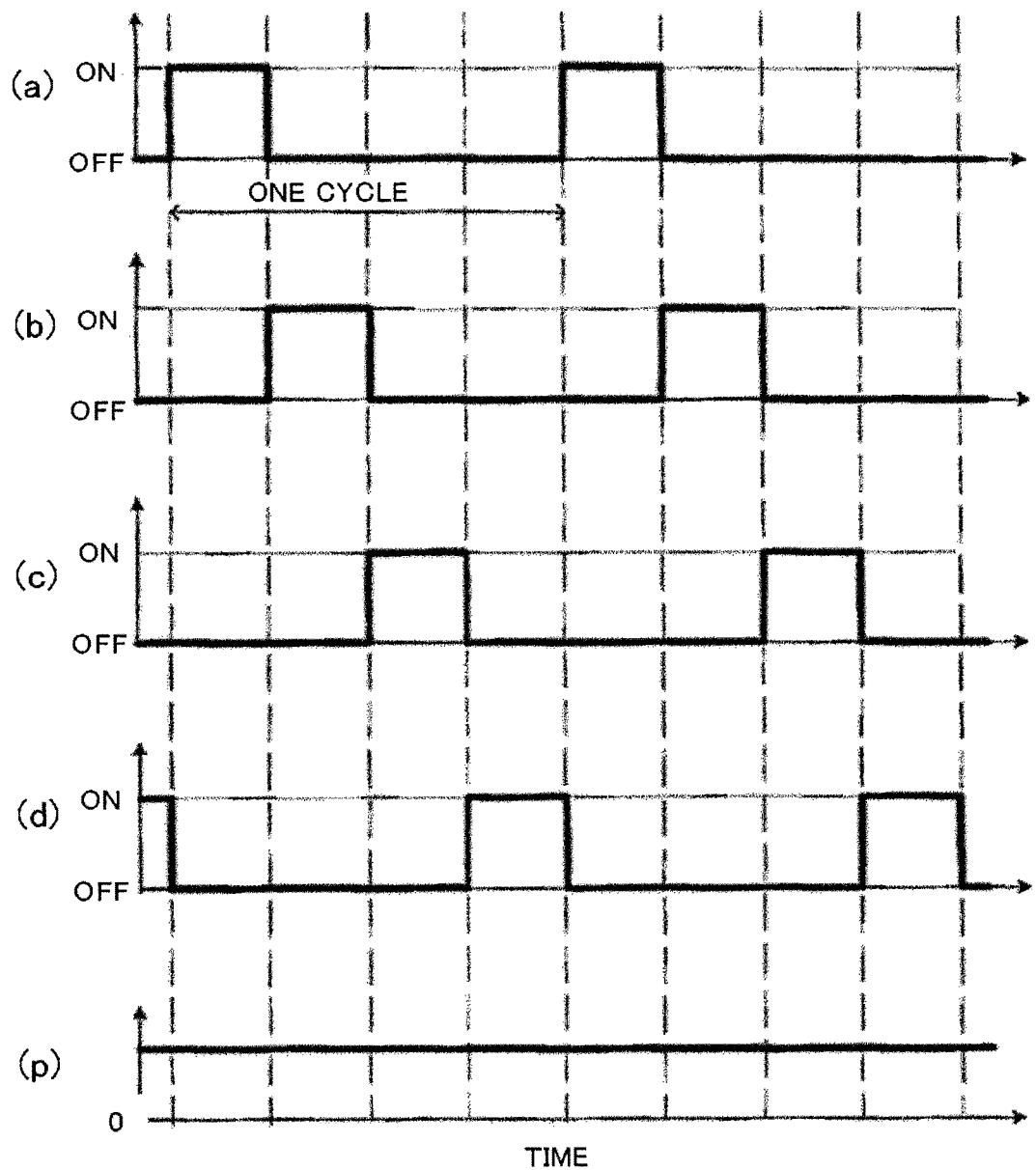
FIG. 6 is a graph illustrating the output power of the power amplification device according to Embodiment 2 of the present disclosure.

FIG. 6 is a graph illustrating the output power of the power amplification device according to Embodiment 2. That is, FIG. 6 is a graph illustrating output from each of the HPAs 26 in the last-stage HPA module 23 as shown in FIG. 5, as well as the transmission microwaves 11 output from the last-stage HPA module. In FIG. 6, the vertical axes of timelines (a), (b), (c), and (d) indicate ON/OFF state of the HPAs 26, and the horizontal axes indicate time. That is, the timelines (a), (b), (c), and (d) illustrate transmission timings of the HPAs 26. In order from top to bottom, the timeline (a) illustrates the waveform of transmission microwaves emitted from an HPA 26(#1), indicating output from the HPA 26(#1); the timeline (b) illustrates the waveform of transmission microwaves emitted from an HPA 26(#2), indicating output from the HPA 26(#2); the timeline (c) illustrates the waveform of transmission microwaves emitted from an HPA 26(#3), indicating output from the HPA 26(#3); the timeline (d) illustrates the waveform of transmission microwaves emitted from an HPA 26(#4), indicating output from the HPA 26(#4); and a timeline (p), positioned at the bottom, illustrates the power (microwave power) of combined transmission microwaves output from the last-stage HPA module 23 (power amplification device 23). The vertical axis of the timeline (p) indicates microwave power, and the horizontal axis indicates time.

In this example, each of the HPAs 26 is assumed to output a repeating pulse with a transmission duty cycle of 25%. In other words, the transmission timings at which the HPAs 26 emit pulsed microwaves are shifted (delayed) sequentially by ¼ of one cycle. Through this control, microwaves with a power of the continuous waves as shown in the timeline (p) positioned at the bottom of FIG. 6 is output from the last-stage HPA module 23 (power amplification device 23). Further, the switching circuit 37 is switched every ¼ cycle synchronously with the timings of the HPAs 26 so as to select an HPA 26 that is in ON-state.

The power amplification device according to Embodiment 2 is a power amplification device that amplifies electromagnetic waves in the microwave transmitters 1 that emit microwaves to the irradiation target 12. More specifically, the power amplification device includes: HPAs 26 that are pulse-driven repeatedly with a predetermined transmission duty cycle and amplify electromagnetic waves; the distribution circuit 22 that is disposed so as to precede the HPAs 26 and distributes electromagnetic waves to the HPAs 26; the phase shifter 25 that is disposed so as to precede the distribution circuit 22, and shifts the phase of input electromagnetic waves and outputs the phase-shifted electromagnetic waves to the distribution circuit 22-side; the switching circuit 37 is disposed so as to follow the HPAs 26, and selects any one of the HPAs 26 and outputs electromagnetic waves received from the selected HPAs 26; and the controller 39 (control device 39) that controls transmission timings of the HPAs 26, the phase shifter 25 and the switching circuit 37.

The controller 39 (control device 39) of the power amplification device according to Embodiment 2 delays the transmission timings of the HPAs 26 sequentially by a transmission time corresponding to a predetermined transmission duty cycle. The controller 39 also switches the switching circuit 37 so as to select an HPA 26 corresponding to a respective transmission timing. Further, the controller 39 controls the phase shifter 25 so that electromagnetic waves output from the switching circuit 37 every transmission timing have a predetermined phase.

That is, to explain Embodiment 2, FIGS. 5 and 6 illustrate an example where four HPAs 26 (power amplifiers 26) have mutually different transmission timings, but the number of such HPAs may be two or three, or five or more. In that case, the HPAs 26 transmit microwaves repeatedly at transmission timings that are shifted (delayed) sequentially by 1/(the number of HPAs 26) of one cycle. Accordingly, the predetermined transmission duty cycle is 1/(the number of HPAs 26).

As explained above, according to Embodiment 2, pulse-output HPAs 26 (power amplifiers 26) are mounted in the last-stage HPA module 23 (power amplification device 23) of the microwave transmitter 1 in a microwave heating furnace (microwave smelting furnace) or the like in which the power flux density of the transmission microwaves 11 is required to be high at the focal portion 4. Also, the HPAs 26 undergo switch control to transmit pulsed waves at shifted transmission timings, and thus the transmission microwaves 11 that are equivalent to high-power continuous waves are emitted. Moreover, by applying the electromagnetic transmission system according to Embodiment 2 to the microwave heating furnace (microwave smelting furnace) shown in FIG. 1 that is used to explain Embodiment 1, beam direction control and beam formation by APAAs as well as the reflection plate 2 can be used to emit continuous transmission microwaves 11 to near the focal portion 4 efficiently, and to enable a control for increasing the power flux density.

Moreover, in contrast to Embodiment 1 in which ON/OFF switching is performed for each microwave transmitter 1 (electromagnetic transmitter 1), that is, for each large unit to transmit microwaves, in Embodiment 2 the outputs of the HPAs 26 (power amplifiers 26) are switched for some of last-stage HPA modules 23 (power amplification devices 23) in the microwave transmitter 1. Hence, when beam directions and/or beam formation are controlled by adjusting phases and/or amplitudes of transmission microwaves 11 transmitted from each of the antenna elements 24, Embodiment 2 provides an advantageous effect of combining transmission microwave beams near the focal portion 4 with an even higher degree of freedom.

The switching circuit 37 (output-side switch 37) of the electromagnetic transmission device, the power amplification device, and the electromagnetic transmission system according to Embodiment 2 exemplified in FIG. 5 achieve high-speed switching if constituted by, for example, a switch using a PIN diode, MOS-FET, or the like.

Embodiment 3

First, differences between Embodiment 3 and Embodiment 2 are explained. The electromagnetic transmission device, the power amplification device, and the electromagnetic transmission system according to Embodiment 2 use the distribution circuit 22 (distributor 22), but an electromagnetic transmission device, a power amplification device, and an electromagnetic transmission system according to Embodiment 3 use a switching circuit 37a (input-side switch 37a) instead of the distribution circuit 22 (distributor 22). Explanation on Embodiment 3 is mainly focused on differences from Embodiment 2.

Figure 7:
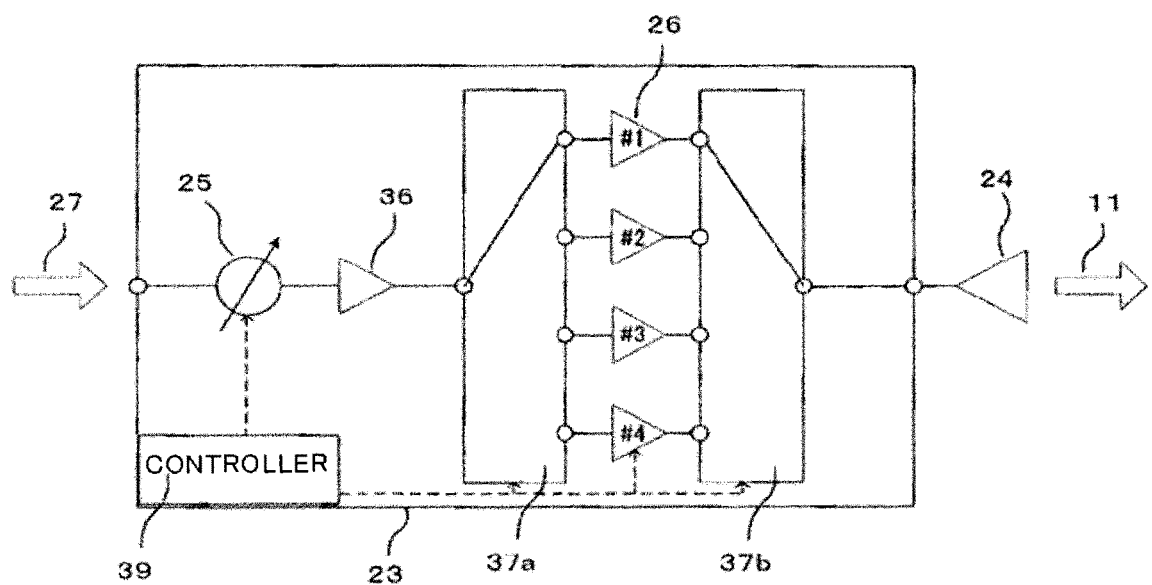
FIG. 7 is a block diagram illustrating a power amplification device according to Embodiment 3 of the present disclosure.

FIG. 7 is a block diagram illustrating the configuration of a last-stage HPA module 23, that is, the power amplification device according to Embodiment 3. In FIG. 7, the switching circuit 37a (input-side switch 37a) switches the output of a pre-amplifier 36 and transmits microwaves amplified by the pre-amplifier 36. HPAs 26 amplify the microwaves transmitted by the switching circuit 37a (input-side switch 37a) to produce high-power microwaves. A switching circuit 37b (output-side switch 37b) switches the outputs of the HPAs 26 and transmits the microwaves. These elements are packaged together as the last-stage HPA module 23. The switching circuit 37b (output-side switch 37b) corresponds to the switching circuit 37 (output-side switch 37) used in Embodiment 2. In the figure, the same reference numerals denote the same or corresponding elements, details of which are not explained herein.

Once a source oscillation signal 27 is input to the last-stage HPA module 23, a phase shifter 25 performs phase adjusting for beam direction control, beam formation, and phase error correction among the HPAs 26. Microwaves amplified by a pre-amplifier 36 are switched and transmitted by the switching circuit 37a, and are amplified by the HPAs 26. The switching circuit 37b switches the outputs of the HPAs 26 and transmits the microwaves to an antenna 24. The antenna 24 transmits continuous transmission microwaves 11. Control signals for controlling the phase shifter 25, the HPAs 26, the switching circuit 37a, and the switching circuit 37b are supplied from the exterior of the last-stage HPA module 23 directly, or from a controller 39 within the last-stage HPA module 23. In the figure, the same reference numerals denote the same or corresponding elements, details of which are not explained herein.

Figure 8:
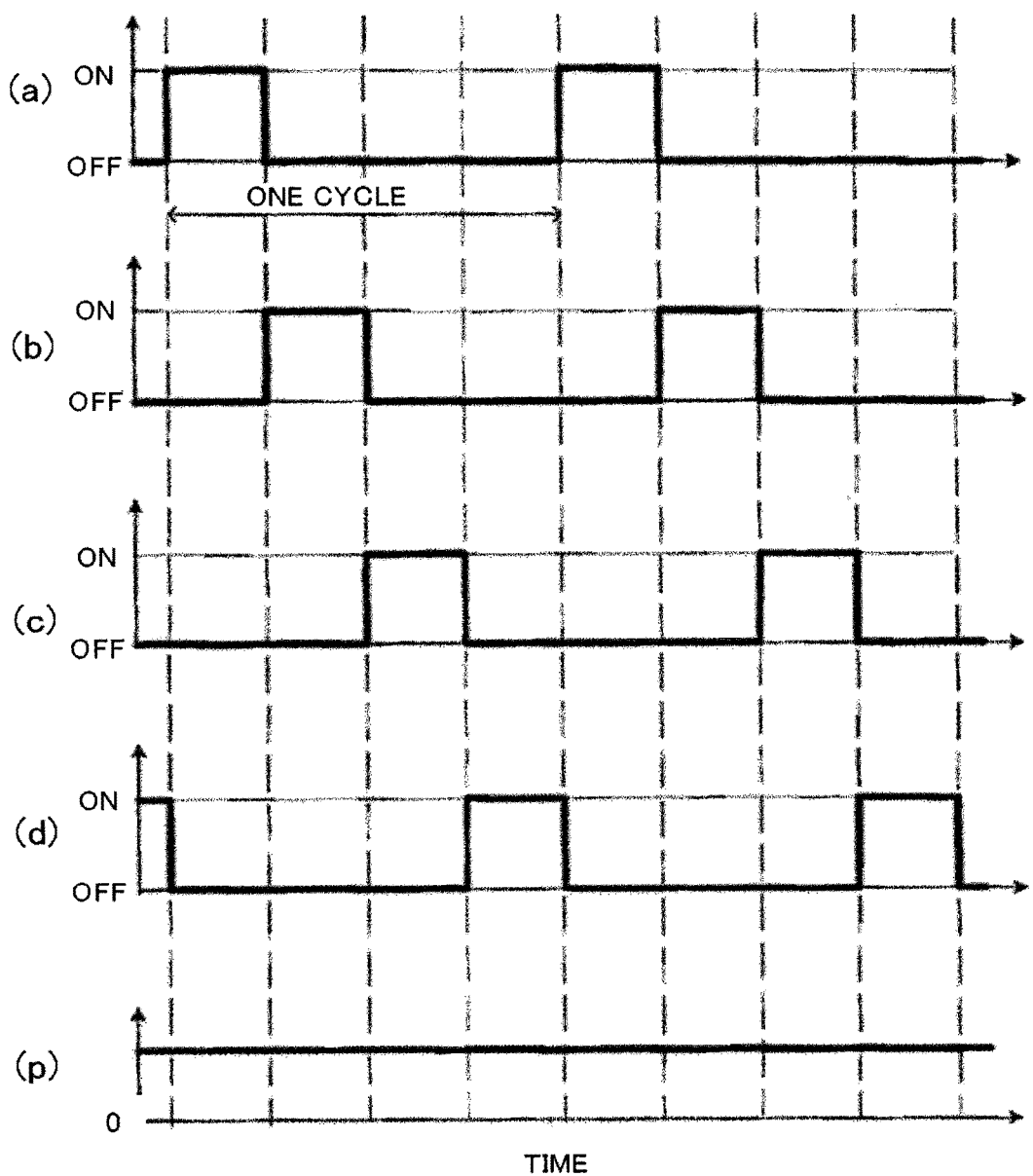
FIG. 8 is a graph illustrating the output power of the power amplification device according to Embodiment 3 of the present disclosure.

FIG. 8 is a graph illustrating the output power of the power amplification device according to Embodiment 3. That is, FIG. 8 is a graph illustrating output from each of the HPAs 26 in the last-stage HPA module 23 as shown in FIG. 7, as well as the transmission microwaves 11 output from the last-stage HPA module. In FIG. 8, the vertical axes of timelines (a), (b), (c), and (d) indicate ON/OFF state of the HPAs 26, and the horizontal axes indicate time. That is, the timelines (a), (b), (c), and (d) illustrate transmission timings of the HPAs 26. In order from top to bottom, the timeline (a) illustrates the waveform of transmission microwaves emitted from an HPA 26(#1), indicating output from the HPA 26(#1); the timeline (b) illustrates the waveform of transmission microwaves emitted from an HPA 26(#2), indicating output from the HPA 26(#2); the timeline (c) illustrates the waveform of transmission microwaves emitted from an HPA 26(#3), indicating output from the HPA 26(#3); the timeline (d) illustrates the waveform of transmission microwaves emitted from an HPA 26(#4), indicating output from the HPA 26(#4); and a timeline (p), positioned at the bottom, illustrates the power (microwave power) of combined transmission microwaves output from the last-stage HPA module 23 (power amplification device 23). The vertical axis of the timeline (p) indicates microwave power, and the horizontal axis indicates time.

In this example, each of the HPAs 26 is assumed to output a repeating pulse with a transmission duty cycle of 25%, similar to Embodiment 2. In other words, the transmission timings at which the HPAs 26 emit pulsed microwaves are shifted (delayed) sequentially by ¼ of one cycle. Through this control, microwaves with a power of the continuous waves as shown in timeline (p) positioned at the bottom of FIG. 8 is output from the last-stage HPA module 23 (power amplification device 23). Further, the switching circuits 37a and 37b are switched every ¼ cycle synchronously with the transmission timings of the HPAs 26 so as to select an HPA 26 that is in ON-state.

Further, similar to Embodiment 2, in Embodiment 3, a plurality of HPAs 26 (power amplifiers 26) is included in the last-stage HPA module 23 (power amplification device 23) and is switched within the last-stage HPA module 23 to transmit microwaves, so that the transmission microwaves 11 that are equivalent to high-power continuous waves are obtained at the output part of the last-stage HPA module 23.

The power amplification device according to Embodiment 3 is a power amplification device that amplifies electromagnetic waves in the microwave transmitters 1 that emit microwaves to the irradiation target 12. More specifically, the power amplification device includes: the HPAs 26 that are pulse-driven repeatedly with a predetermined transmission duty cycle and amplify electromagnetic waves; the switching circuit 37a that is disposed so as to precede the HPAs 26, and selects any one of the HPAs 26 and outputs electromagnetic waves to the selected HPA 26; the phase shifter 25 that is disposed so as to precede the switching circuit 37a, and shifts the phase of input electromagnetic waves and outputs the phase-shifted electromagnetic waves to the switching circuit 37a-side; and the switching circuit 37b that is disposed so as to follow the HPAs 26, and selects any one of the HPAs 26 and outputs electromagnetic waves received from the selected HPA 26; and the controller 39 (the control device 39) that controls transmission timings of the HPAs 26, the phase shifter 25, the switching circuit 37a, and the switching circuit 37b.

The controller 39 (control device 39) of the power amplification device according to Embodiment 3 delays the transmission timings of the HPAs 26 sequentially by a transmission time corresponding to a predetermined transmission duty cycle. The controller 39 also switches the switching circuits 37a and 37b so as to select an HPA 26 corresponding to a respective transmission timing. Further, the controller 39 controls the phase shifter 25 so that electromagnetic waves output from the switching circuit 37b every transmission timing have a predetermined phase.

That is, to explain Embodiment 3, FIGS. 7 and 8 illustrate an example where four HPAs 26 (power amplifiers 26) have mutually different transmission timings, but the number of such HPAs may be two or three, or five or more, similar to Embodiment 2. In that case, the HPAs 26 transmit microwaves repeatedly at transmission timings that are shifted (delayed) sequentially by 1/(the number of HPAs 26) of one cycle. Accordingly, the predetermined transmission duty cycle is 1/(the number of HPAs 26).

As described above, Embodiment 3 provides similar advantageous effects to those of Embodiment 2. Further, according to Embodiment 3, the input-side switching circuit 37a that is disposed on the input-side of HPAs 26 and the output-side switching circuit 37b that is disposed on the output-side of HPAs 26 have the same configuration and/or circuit as those of the switching circuit 37 used in Embodiment 2, and thus are controlled by the same signal. Hence, Embodiment 3 provides an advantageous effect of simplification of circuits and the like.

Embodiment 4

First, differences between Embodiment 4 and Embodiment 2 are explained. The electromagnetic transmission device, the power amplification device, and the electromagnetic transmission system according to Embodiment 2 use the switching circuit 37b (output-side switch 37b), but an electromagnetic transmission device, a power amplification device, and an electromagnetic transmission system according to Embodiment 4 use a combining circuit 38 (combiner 38) instead of the distribution circuit switching circuit 37b (output-side switch 37b). Explanation on Embodiment 4 is mainly focused on differences from Embodiment 2. This also helps to distinguish Embodiment 4 from Embodiment 3.

Figure 9:
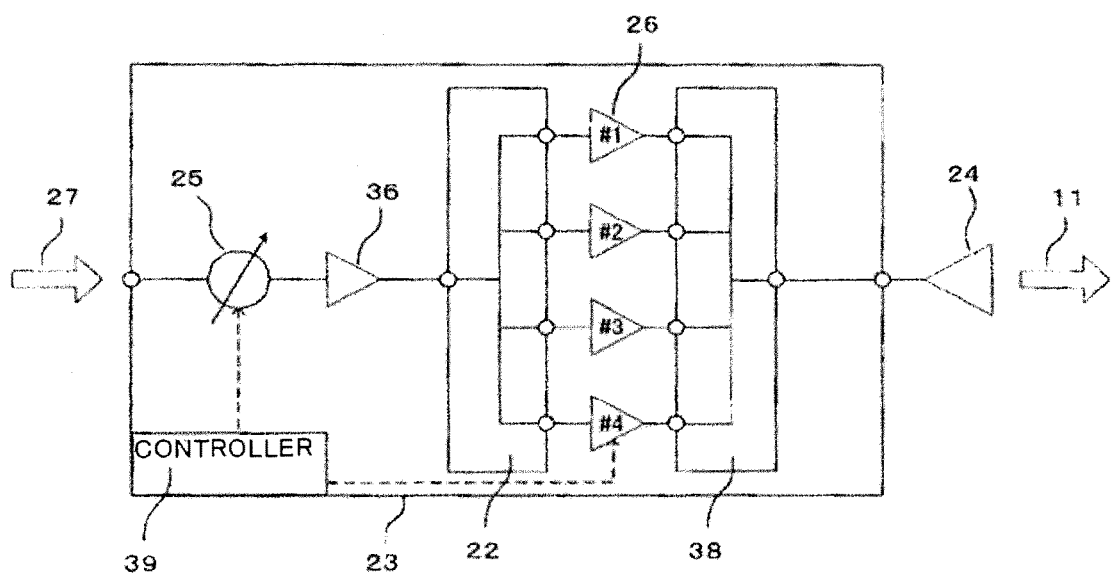
FIG. 9 is a block diagram illustrating a power amplification device according to Embodiment 4 of the present disclosure.

FIG. 9 is a block diagram illustrating the configuration of a last-stage HPA module 23, that is, the power amplification device according to Embodiment 4. In FIG. 9, a distribution circuit 22 (distributor 22) distributes and transmits amplified microwaves. A combining circuit (combiner 38) combines the outputs of HPAs 26. These elements are packaged together as the last-stage HPA module 23. In the figure, the same reference numerals denote the same or corresponding elements, details of which are not explained herein.

Once a source oscillation signal 27 is input to the last-stage HPA module 23, a phase shifter 25 performs phase adjusting for beam direction control, beam formation, and phase error correction among the HPAs 26. The distribution circuit 22 distributes and transmits microwaves amplified by the pre-amplifier 36. Then, the microwaves are amplified by the HPAs 26, and are combined and output by the combining circuit 38. An antenna 24 transmits continuous transmission microwaves 11. Control signals for controlling the phase shifter 25 and the HPAs 26 are supplied from the exterior of the last-stage HPA module 23 directly, or from the controller 39 within the last-stage HPA module 23. In the figure, the same reference numerals denote the same or corresponding elements, details of which are not explained herein.

Figure 10:
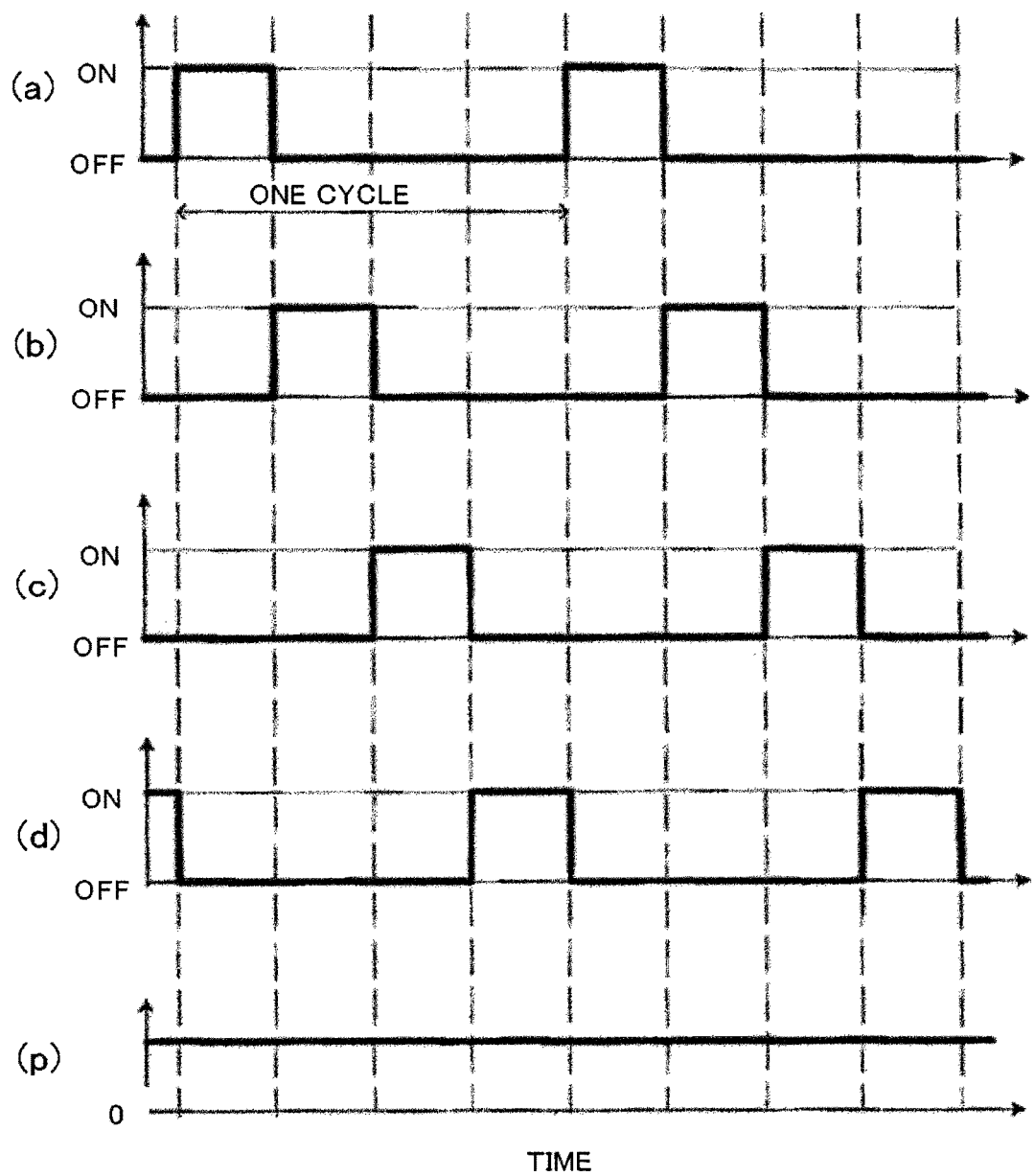
FIG. 10 is a graph illustrating the output power of the power amplification device according to Embodiment 4 of the present disclosure.

FIG. 10 is a graph illustrating the output power of the power amplification device according to Embodiment 4. That is, FIG. 10 is a graph illustrating output from each of the HPAs 26 in the last-stage HPA module 23 as shown in FIG. 9, as well as the transmission microwaves 11 output from the last-stage HPA module. In FIG. 10, the vertical axes of timelines (a), (b), (c), and (d) indicate ON/OFF state of the HPAs 26, and the horizontal axes indicate time. That is, the timelines (a), (b), (c), and (d) illustrate transmission timings of the HPAs 26. In order from top to bottom, the timeline (a) illustrates the waveform of transmission microwaves emitted from an HPA 26(#1), indicating output from the HPA 26(#1); the timeline (b) illustrates the waveform of transmission microwaves emitted from an HPA 26(#2), indicating output from the HPA 26(#2); the timeline (c) illustrates the waveform of transmission microwaves emitted from an HPA 26(#3), indicating output from the HPA 26(#3); the timeline (d) illustrates the waveform of transmission microwaves emitted from an HPA 26(#4), indicating output from the HPA 26(#4); and a timeline (p), positioned at the bottom, illustrates the power (microwave power) of combined transmission microwaves output from the last-stage HPA module 23 (power amplification device 23). The vertical axis of the timeline (p) indicates microwave power, and the horizontal axis indicates time.

In this example, each of the HPAs 26 is assumed to output a repeating pulse with a transmission duty cycle of 25%, similar to Embodiments 2 and 3. In other words, the transmission timings at which the HPAs 26 emit pulsed microwaves are shifted (delayed) sequentially by ¼ of one cycle. Through this control, microwaves with a power of the continuous waves as shown in the timeline (p) positioned at the bottom of FIG. 10 is output from the last-stage HPA module 23 (power amplification device 23).

Further, similar to Embodiments 2 and 3, in Embodiment 4, a plurality of HPAs 26 (power amplifiers 26) is included in the last-stage HPA module 23 (power amplification device 23) and is switched within the last-stage HPA module 23 to transmit microwaves, so that the transmission microwaves 11 that are equivalent to high-power continuous waves are obtained at the output part of the last-stage HPA module 23.

The power amplification device according to Embodiment 4 is a power amplification device that amplifies electromagnetic waves in the microwave transmitters 1 that emit microwaves to the irradiation target 12. More specifically, the power amplification device includes: the distribution circuit 22 that is disposed so as to precede the HPAs 26 and distributes electromagnetic waves to the power amplifiers; the phase shifter 25 that is disposed so as to precede the distribution circuit 22, and shifts the phase of input electromagnetic waves and outputs the phase-shifted electromagnetic waves to the distribution circuit 22-side; the combining circuit 38 that is disposed so as to follow the HPAs 26, and combines electromagnetic waves received from the HPAs 26 and outputs the combined electromagnetic waves; and the controller 39 (control device 39) that controls transmission timings of the HPAs 26 and the phase shifter 25.

The controller 39 (control device 39) of the power amplification device according to Embodiment 4 delays the transmission timings of the HPAs 26 sequentially by a transmission time corresponding to a predetermined transmission duty cycle. The controller 39 also controls the phase shifter 25 so that electromagnetic waves output from the combining circuit 38 every transmission timing have a predetermined phase.

That is, to explain Embodiment 4, FIGS. 9 and 10 illustrate an example where four HPAs 26 (power amplifiers 26) have mutually different transmission timings, but the number of such HPAs may be two or three, or five or more, similar to Embodiments 2 and 3. In that case, the HPAs 26 transmit microwaves repeatedly at transmission timings that are shifted (delayed) sequentially by 1/(the number of HPAs 26) of one cycle. Accordingly, the predetermined transmission duty cycle is 1/(the number of HPAs).

As described above, Embodiment 4 provides similar advantageous effects to those of Embodiments 2 and 3. Further, in Embodiment 4, there is no need to synchronize the switching of switching means with the ON/OFF control of the HPAs 26, in contrast to Embodiments 2 and 3. Thus, the Embodiment 4 provides an advantageous effect of simplification of the controller 39 (control device 39).

As understood from the above explanation, the power amplification devices according to Embodiments 2 to 4 may be said to amplify electromagnetic waves in the microwave transmitters 1 that emit electromagnetic waves onto the irradiation target, and include HPAs 26 that are pulse-driven repeatedly with a predetermined duty cycle and amplify electromagnetic waves. The HPAs 26 may be said to be pulse-driven at mutually different transmission timings, a time interval between adjacent transmission timings of the different transmission timings being a transmission time corresponding to a predetermined transmission duty cycle.

In the power amplification devices (electromagnetic transmission devices) according to Embodiments 2 to 4, the control circuit 39 may be disposed in the last-stage HPA module 23 (electromagnetic transmitter 1) to pulse-drive the HPAs 26 (power amplifiers 26) via the control circuit 39. That is, the control circuit 39 delays the transmission timings of the HPAs 26 sequentially by a transmission time corresponding to a predetermined transmission duty cycle.

Embodiments 5 and 6 are explained below, and the relationship between Embodiments 5 and 6 and Embodiment 4 is explained beforehand. Electromagnetic transmission devices, power amplification devices, and electromagnetic transmission systems according to Embodiments 5 and 6 are obtained by incorporating switching circuits 37a and 37b into the electromagnetic transmission device, the power amplification device, and the electromagnetic transmission system according to Embodiment 4. The arrangement of the switching circuits 37a and 37b is summarized below. The switching circuit 37a is disposed either between a preamplifier 36 and a distribution circuit 22, or between the distribution circuit 22 and HPAs 26, in the electromagnetic transmission device, the power amplification device, and the electromagnetic transmission system according to Embodiment 4. The switching circuit 37b is disposed either between the HPAs 26 and a combining circuit 38, or between the combining circuit 38 and an antenna 24, in the electromagnetic transmission device, the power amplification device, and the electromagnetic transmission system according to Embodiment 4.

More specifically, in the power amplification devices (power amplification devices 23, last-stage HPA modules 23) according to Embodiments 5 and 6, a switching circuit 37a is disposed so as to follow a phase shifter 25 and so as to precede or follow the distribution circuit 22, and selects either a plurality of sets of HPAs 26 or a plurality of HPAs 26 as connection destinations and transmits electromagnetic waves thereto. Also, if the switching circuit 37a is disposed so as to precede the distribution circuit 22, the switching circuit 37b is disposed so as to follow the combining circuit 38, as described later in Embodiment 5. If the switching circuit 37a is disposed so as to follow the distribution circuit 22, the switching circuit 37b is disposed so as to precede the combining circuit 38, as described later in Embodiment 6. Further, the switching circuit 37b selects the connection destinations (either set of the plurality of sets of HPAs 26 or the plurality of HPAs 26) that are being selected by the switching circuit 37a, and receives electromagnetic waves therefrom.

In the power amplification devices (power amplification devices 23, last-stage HPA modules 23) according to Embodiments 5 and 6, a controller 39 (the control device 39) sequentially delays the transmission timings of at least HPAs 26 that are selected as the connection destinations by a transmission time corresponding to a predetermined transmission duty cycle. The controller 39 (control device 39) switches the switching circuits 37a and 37b so as to select a plurality of sets of HPAs 26 corresponding to a respective transmission timing. The controller 39 also controls the phase shifter so that electromagnetic waves output from the combining circuit 38 every transmission timing have a predetermined phase.

In Embodiments 5 and 6, the HPAs 26 transmit microwaves repeatedly at transmission timings that are shifted (delayed) sequentially by 1/(the number of HPAs 26) of one cycle, similar to Embodiments 2 to 4. Accordingly, the predetermined transmission duty cycle is 1/(the number of HPAs 26). The number of HPAs 26 in Embodiments 5 and 6 is equal to the number of HPAs 26 to be pulse-driven at mutually different transmission timings. Accordingly, the predetermined transmission duty cycle may be said to be 1/(the number of HPAs 26 to be pulse-driven at mutually different transmission timings).

This is because Embodiments 5 and 6 may include a case where HPAs 26 in the same set are controlled to have mutually different transmission timings while HPAs 26 in different sets are controlled to have the same transmission timing so that two HPAs 26 emit (transmit) electromagnetic waves (transmission microwaves 11) onto the irradiation target 12. Hence, in Embodiments 5 and 6 as well, the HPAs 26 may be said to transmit microwaves repeatedly at transmission timings that are shifted (delayed) sequentially by 1/(the number of HPAs 26 to be pulse-driven at mutually different timings) of one cycle.

Further, a plurality of HPAs 26, one from each different set, is controlled to operate at the same transmission timing, and thus microwaves corresponding to outputs from the number of HPAs 26 are obtained at the output part of the last-stage HPA module 23, the number of HPAs 26 being equal to the number of sets.

Further, a plurality of HPAs 26, at least one from each different set, is controlled to operate at the same transmission timing, and thus microwaves corresponding to outputs from the number of HPAs 26 are obtained at the output part of the last-stage HPA module 23, the number of HPAs 26 being equal to the number of sets.

Embodiment 5

Figure 11:
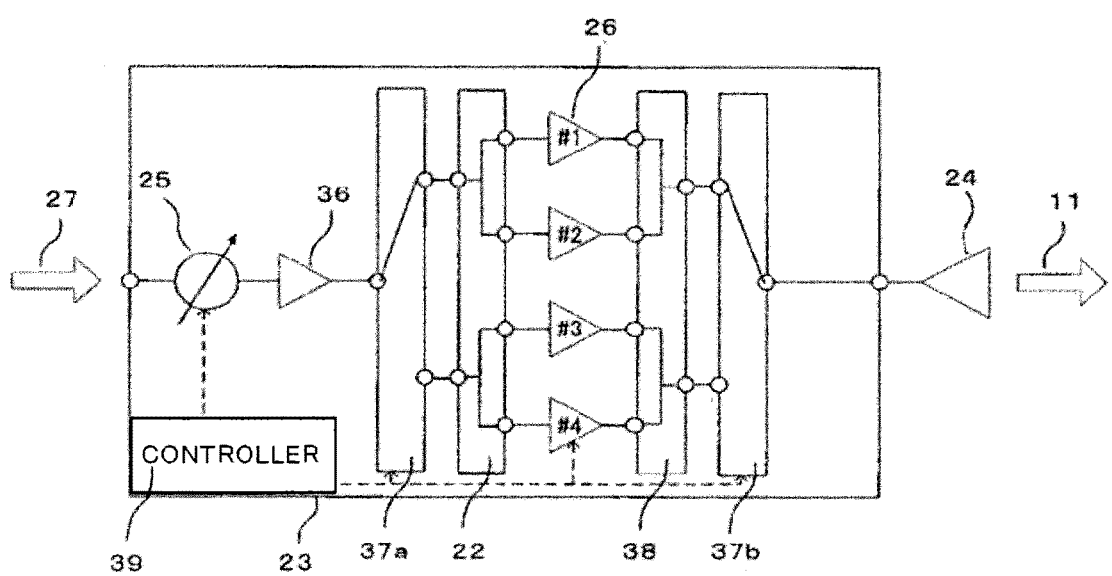
FIG. 11 is a block diagram illustrating a power amplification device according to Embodiment 5 of the present disclosure.

Explanation on Embodiment 5 is mainly focused on differences from Embodiment 4. FIG. 11 is a block diagram illustrating the configuration of the last-stage HPA module 23, that is, the power amplification device according to Embodiment 5. In FIG. 11, the switching circuit 37*a* (input-side switch 37*a*) switches and transmits microwaves amplified by the pre-amplifier 36. The distribution circuit 22 (distributor 22) distributes and transmits the amplified microwaves. The combining circuit 38 (combiner 38) combines the outputs from the HPAs 26. The switching circuit 37*b* (output-side switch 37*b*) switches and transmits microwaves. These elements are packaged together as the last-stage HPA module 23. In the figure, the same reference numerals denote the same or corresponding elements, details of which are not explained herein.

Once a source oscillation signal 27 is input to the last-stage HPA module 23, the phase shifter 25 performs phase adjusting for beam direction control, beam formation, and phase error correction among the HPAs 26. Microwaves amplified by the pre-amplifier 36 are switched by the switching circuit 37*a* and distributed by the distribution circuit 22, and are then transmitted. The microwaves are amplified by the HPAs 26 and combined by the combining circuit 38, and are then switched and transmitted by the switching circuit 37*b*. The antenna 24 transmits continuous transmission microwaves 11. Control signals for controlling the phase shifter 25, the HPAs 26, the switching circuit 37*a*, and the switching circuit 37*b* are supplied from the exterior of the last-stage HPA module 23 directly, or from the controller 39 within the last-stage HPA module 23. In the figure, the same reference numerals denote the same or corresponding elements, details of which are not explained herein.

Figure 12:
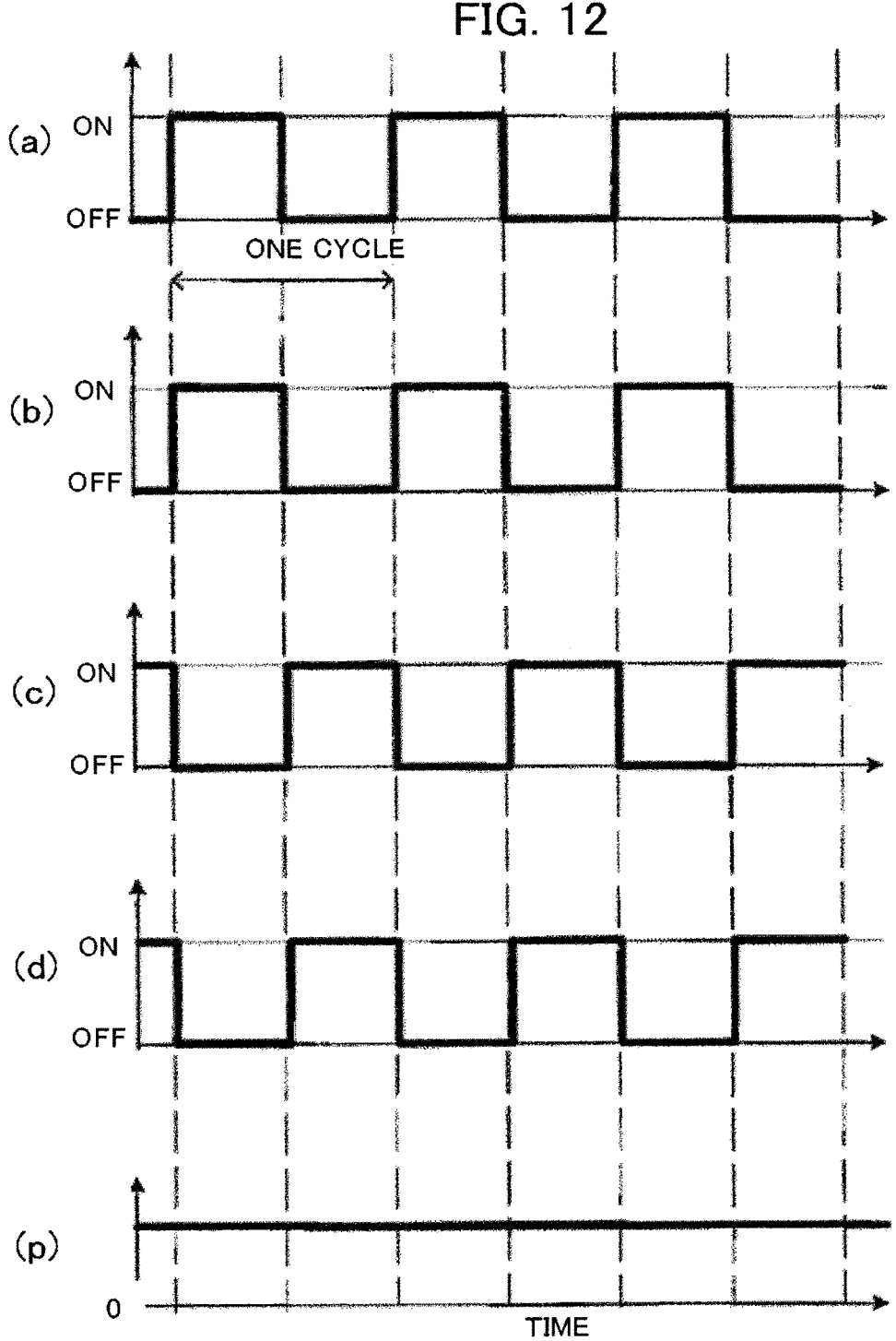
FIG. 12 is a graph illustrating the output power of the power amplification device according to Embodiment 5 of the present disclosure.

FIG. 12 is a graph illustrating the output power of the power amplification device according to Embodiment 5. That is, FIG. 12 is a graph illustrating output from each of the HPAs 26 in the last-stage HPA module 23 as shown in FIG. 11, as well as the transmission microwaves 11 output from the last-stage HPA module. In FIG. 12, the vertical axes of timelines (a), (b), (c), and (d) indicate ON/OFF state of the HPAs 26, and the horizontal axes indicate time. In other words, the timelines (a), (b), (c), and (d) indicate transmission timings of the HPAs 26. In order from top to bottom, the timeline (a) illustrates the waveform of transmission microwaves emitted from an HPA 26(#1), indicating output from the HPA 26(#1); the timeline (b) illustrates the waveform of transmission microwaves emitted from an HPA 26(#2), indicating output from the HPA 26(#2); the timeline (c) illustrates the waveform of transmission microwaves emitted from an HPA 26(#3), indicating output from the HPA 26(#3); the timeline (d) illustrates the waveform of transmission microwaves emitted from an HPA 26(#4), indicating output from the HPA 26(#4); a timeline (p), positioned at the bottom, illustrates the power (microwave power) of combined transmission microwaves output from the last-stage HPA module 23 (power amplification device 23). The vertical axis of the timeline (p) indicates microwave power, and the horizontal axis indicates time.

Differing from Embodiment 4, in this example the HPAs 26 are divided into a set of #1HPA26 and #3HPA26 and a set of #2HPA26 and #4HPA 26 shown in FIG. 11, and the HPAs 26 in each set are assumed to output a repeating pulse with a transmission duty cycle of 50%. In other words, the transmission timings at which the HPAs 26 in each set emit pulsed microwaves are shifted (delayed) sequentially by ½ of one cycle. Through this control, microwaves with a power of the continuous waves as shown in the timeline (p) positioned at the bottom of FIG. 12 are output from the last-stage HPA module 23 (power amplification device 23). Further, the switching circuits 37*a* and 37*b* are switched every ½ cycle synchronously with the transmission timings of the HPAs 26 so as to select an HPA 26 set that is in ON-state. Moreover, two HPAs 26, one from each set, are switched ON synchronously as shown in FIG. 12, and thus microwaves corresponding to outputs from two HPAs 26 are obtained. FIG. 12 illustrates that #1HPA26 and #2HPA26 are switched ON at the same transmission timing.

Further, similar to Embodiment 4, in Embodiment 5, a plurality of HPAs 26 (power amplifiers 26) is included in the last-stage HPA module 23 (power amplification device 23) and is switched within the last-stage HPA module 23 to transmit microwaves, so that the transmission microwaves 11 that are equivalent to high-power continuous waves are obtained at the output part of the last-stage HPA module 23. Additionally, two HPAs 26, one from each set, are switched ON synchronously, and thus microwaves corresponding to outputs from two HPAs 26 are obtained. This is because the number of the sets used in Embodiment 5 is two.

That is, according to Embodiment 5, the outputs of two HPAs 26 included in different sets, for example, #1 and #2, or #3 and #4, are combined together within the last-stage HPA module 23. Thus, Embodiment 5 provides an advantageous effect of outputting even higher power microwaves from the last-stage HPA module 23.

To explain Embodiment 5, FIGS. 11 and 12 illustrate an example where two HPAs 26 (power amplifiers 26) have mutually different transmission timings, but the number of such HPAs may be three or more. In that case, the HPAs 26 transmit microwaves repeatedly at transmission timings that are shifted (delayed) sequentially by 1/(the number of HPAs 26 per set) of one cycle. Accordingly, the predetermined transmission duty cycle is 1/(the number of HPAs 26 per set). The number of sets of HPAs 26 is two or more. The number of HPAs 26 per set may be said to be the number of HPAs 26 (power amplifiers 26) to be pulse-driven at mutually different transmission timings.

Embodiment 6

Figure 13:
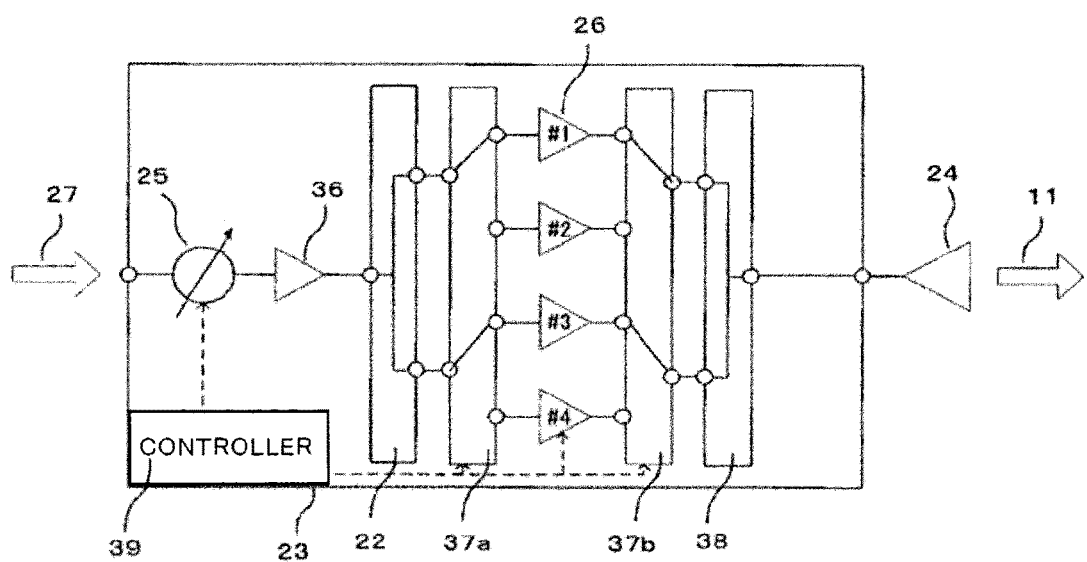
FIG. 13 is a block diagram illustrating a power amplification device according to Embodiment 6 of the present disclosure.

Explanation on Embodiment 6 is mainly focused on differences from Embodiment 4. FIG. 13 is a block diagram illustrating the configuration of the last-stage HPA module 23, that is, the power amplification device according to Embodiment 6. In FIG. 13, the distribution circuit 22 (distributor 22) distributes microwaves amplified by the pre-amplifier 36. The switching circuit 37*a* (input-side switch 37*a*) switches and transmits microwaves. The switching circuit 37*b* (output-side switch 37*b*) switches the outputs of the HPAs 26 and transmits the microwaves. The combining circuit (combiner 38) combines the microwaves. These elements are packaged together as the last-stage HPA module 23. In the figure, the same reference numerals denote the same or corresponding elements, details of which are not explained herein.

Once a source oscillation signal 27 is input to the last-stage HPA module 23, the phase shifter 25 performs phase adjusting for beam direction control, beam formation, and phase error correction among the HPAs 26. Microwaves amplified by the pre-amplifier 36 are distributed by the distribution circuit 22 and switched by the switching circuit 37a, and are then transmitted. The microwaves are amplified by the HPAs 26, and switched by the switching circuit 37b, and are then combined by the combining circuit 38. The antenna 24 transmits continuous transmission microwaves 11. Control signals for controlling the phase shifter 25, the HPAs 26, the switching circuit 37a, and the switching circuit 37b are supplied from the exterior of the last-stage HPA module 23 directly, or from the controller 39 within the last-stage HPA module 23. In the figure, the same reference numerals denote the same or corresponding elements, details of which are not explained herein.

Figure 14:
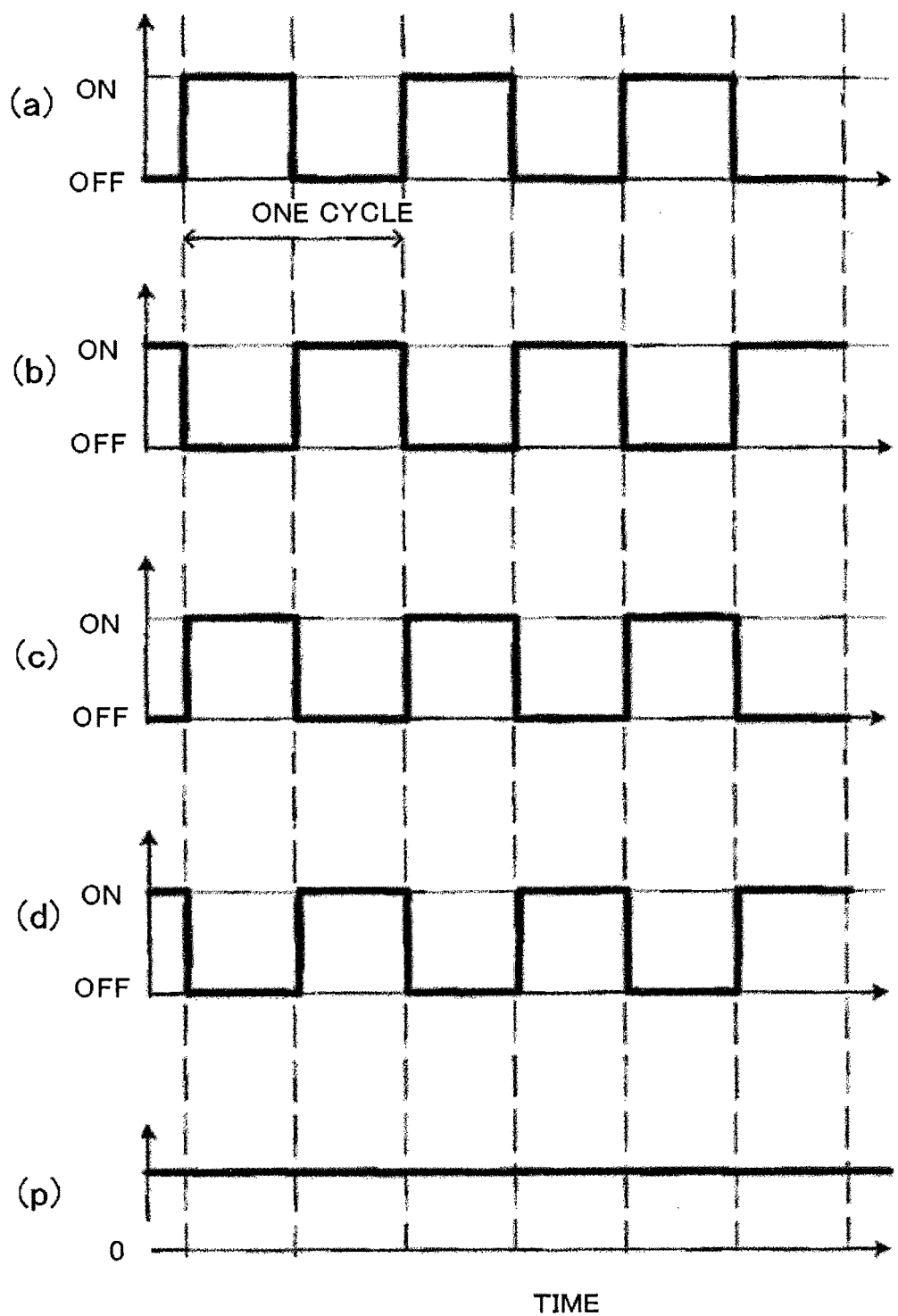
FIG. 14 is a graph illustrating the output power of the power amplification device according to Embodiment 6 of the present disclosure.

FIG. 14 is a graph illustrating the output power of the power amplification device according to Embodiment 6. That is, FIG. 14 is a graph illustrating output from each of the HPAs 26 in the last-stage HPA module 23 as shown in FIG. 13, as well as the transmission microwaves 11 output from the last-stage HPA module 23. In FIG. 14, the vertical axes of timelines (a), (b), (c), and (d) indicate ON/OFF state of the HPAs 26, and the horizontal axes indicate time. In other words, the timelines (a), (b), (c), and (d) illustrate transmission timings of the HPAs 26. In order from top to bottom, the timeline (a) illustrates the waveform of transmission microwaves emitted from an HPA 26(#1), indicating output from the HPA 26(#1); the timeline (b) illustrates the waveform of transmission microwaves emitted from an HPA 26(#2), indicating output from the HPA 26(#2); the timeline (c) illustrates the waveform of transmission microwaves emitted from an HPA 26(#3), indicating output from the HPA 26(#3); the timeline (d) illustrates the waveform of transmission microwaves emitted from an HPA 26(#4), indicating output from the HPA 26(#4); and a timeline (p), positioned at the bottom, illustrates the power (microwave power) of combined transmission microwaves output from the last-stage HPA module 23 (power amplification device 23). The vertical axis of the timeline (p) indicates microwave power, and the horizontal axis indicates time.

Differing from Embodiment 4, in this example the HPAs 26 are divided into a set of #1HPA26 and #2HPA and a set of #3HPA 26 and #4HPA shown in FIG. 11, and the HPAs 26 in each set are assumed to output a repeating pulse with a transmission duty cycle of 50%. In other words, the transmission timings at which the HPAs 26 in each set emit pulsed microwaves are shifted (delayed) sequentially by ½ of one cycle. Through this control, microwaves with a power of the continuous waves as shown in the timeline (p) positioned at the bottom of FIG. 14 is output from the last-stage HPA module 23 (power amplification device 23). Further, the switching circuits 37a and 37b are switched every ½ cycle synchronously with the transmission timings of the HPAs 26 so as to select an HPA 26 set that is in ON-state. Moreover, two HPAs 26, one from each set, are switched ON synchronously as shown in FIG. 14, and thus microwaves corresponding to outputs from two HPAs 26 are obtained. FIG. 14 illustrates that #1HPA26 and #3HPA26 are switched ON at the same transmission timing.

Further, similar to Embodiment 4, in Embodiment 6, a plurality of HPAs 26 (power amplifiers 26) is included in the last-stage HPA module 23 (power amplification device 23) and is switched within the last-stage HPA module 23 to transmit microwaves, so that the transmission microwaves 11 that are equivalent to high-power continuous waves are obtained at the output part of the last-stage HPA module 23. Additionally, two HPAs 26, one from each set, are switched ON synchronously, and thus microwaves corresponding to outputs from two HPAs 26 are obtained. This is because the number of the sets used in Embodiment 6 is two, similar to Embodiment 5.

That is, according to Embodiment 6, the outputs of two HPAs 26 included in different sets, for example, #1 and #3, or #2 and #4, is combined together within the last-stage HPA module 23. Thus, Embodiment 6 provides an advantageous effect of outputting even higher power microwaves from the last-stage HPA module 23.

Further, in Embodiment 6, simultaneously-operating HPAs 26 have more space therebetween than those of Embodiment 5, and accordingly Embodiment 6 provides an advantageous effect of mitigating problems concerning heat radiation from HPAs 26, thereby providing stable operation, even if high-output HPAs 26 that involve a great amount of heat radiation are mounted. Referring to FIG. 13, a combination of #1HPA26 and #2HPA26 and a combination of #3HPA26 and #4HPA26 are arrayed in order. Hence, while #1HPA26 is in ON state, #2HPA26 is in OFF state. During this time period, #3HPA26 adjacent to #2HPA26 is in ON state, and #4HPA26 adjacent to #3HPA26 is in OFF state. Thus, concentration of heat is prevented. Therefore, Embodiment 6 may be said to mitigate problems concerning heat radiation from HPAs 26, in contrast to FIG. 11, which is used to explain Embodiment 5, where adjacent HPAs 26 are in ON state simultaneously.

To explain Embodiment 6, FIGS. 13 and 14 illustrate an example where two HPAs 26 (power amplifiers 26) have mutually different transmission timings, but the number of such HPAs may be three or more, similar to Embodiment 5. In that case, the HPAs 26 transmit microwaves repeatedly at transmission timings that are shifted (delayed) sequentially by 1/(the number of HPAs 26 per set) of one cycle. Accordingly, the predetermined transmission duty cycle is 1/(the number of HPAs 26 per set). The number of sets of HPAs 26 is two or more. The number of HPAs 26 per set may be said to be the number of HPAs 26 (power amplifiers 26), the targets to be pulse-driven at mutually different transmission timings.

In Embodiments 2 to 6, the ON/OFF switch timing of the HPAs 26 and/or the switch timing of the switching circuit 37 (switching circuits 37a and 37b) are controlled by transmitting switch-timing clock signals to the HPAs 26 and/or the switching circuit 37 from the control circuit 30, which is disposed to the exterior of the last-stage HPA module 23. When the last-stage HPA module 23 includes a plurality of control targets such as switch targets, for example, HPAs 26 and switching circuit 37 (switching circuits 37a and 37b), a simple controller 39 may be provided within the last-stage HPA module 23 to control these targets. This enables the control circuit 30 to simply transmit one type of clock signal, that is, a reference signal for switching, to each last-stage HPA module 23. As such, the control circuit 30 is simplified. This configuration is equivalent to the configurations shown in FIGS. 5, 7, 9, 11 and 13, which are equipped with the controller 39.

Further, Embodiments 1 to 6 mainly explain a microwave heating furnace (microwave smelting furnace) by way of example, indicating application to heating systems that include microwave reaction furnaces, microwave refining furnaces, microwave melting furnaces, microwave blast furnaces, microwave sintering furnaces, and the like. However, the radio wave transmission systems according to Embodiments 1 to 6 can also be applied to microwave power transmission systems that transmit and direct microwaves onto a power receiver disposed at a predetermined position to perform irradiation, similar to the heating systems. In such microwave power transmission systems as well, performing switch control on high-power pulse-output microwave transmitters and HPA modules enables the stable emission of high-power microwaves equivalent to continuous waves, resulting in a stable power supply. Further, by installation of a plurality of microwave transmitters and HPA modules, highly-extensible microwave transmission systems that can be enlarged in scale and/or increased in output power is achieved.

Further, Embodiments 1 to 6 explain microwave systems by way of example, but other systems transmitting electromagnetic waves such as millimeter waves, terahertz waves, or the like, also provide similar advantageous effects of emitting electromagnetic waves equivalent to high-power continuous waves efficiently, by switching and use of pulse-output electromagnetic transmission devices and power amplifiers that are suitable for respective electromagnetic waves.

As describe above, the electromagnetic transmission devices, the power amplification devices, and the electromagnetic transmission systems according to Embodiments 1 to 6 emit high-power microwaves equivalent to continuous waves stably and efficiently onto an intended position, by performing switch control on the high-power pulse-output microwave transmitters 1 and the last-stage HPA modules 23, with no need for a microwave transmitter or an HPA module that transmits high-power continuous microwaves.

REFERENCE SIGNS LIST

1 Microwave transmitter (Electromagnetic transmitter)
2 Reflection plate
3 Heating furnace
4 Focal portion
5 Window
11 Transmission microwaves
12 Material (Irradiation target)
21 First-stage HPA module
22 Distribution circuit (Distributor)
23 Last-stage HPA module (Power amplification device)
24 Antenna
25 Phase shifter
26 HPA (Power amplifier)
27 Source oscillation signal
28 Microwaves amplified at the first stage
29 Distributed microwaves
30 Control circuit (Controller)
31 Microwave-transmitter control signal
32 First-stage HPA module control signal
33 Last-stage HPA module control signal
34 Signal generator
35 Antenna control unit
36 Pre-amplifier
37 Switching circuit (Switch)
38 Combining circuit (Combiner)
39 Controller (Control device)

The invention claimed is:

1. An electromagnetic transmission device comprising:
a plurality of electromagnetic transmitters;
a plurality of electromagnetic transmission units, each of the electromagnetic transmission units including an equal number of electromagnetic transmitters of the plurality of electromagnetic transmitters; and
a control device configured to control, for each of the plurality of electromagnetic transmission units, transmission timings for a time to start and stop transmission by each of the equal number of electromagnetic transmitters to enable the equal number of electromagnetic transmitters to emit electromagnetic waves onto a focal portion where an irradiation target is disposed, the electromagnetic waves being modulated by a repeating pulse with a predetermined transmission duty cycle, wherein
the control device is configured to sequentially delay, for each of the plurality of electromagnetic transmission units, the transmission timings for the time to start and stop transmission by each of the equal number of electromagnetic transmitters by a transmission time corresponding to the predetermined transmission duty cycle, and the control device is configured to control any one of the equal number of electromagnetic transmitters included in one of the plurality of electromagnetic transmission units to operate at the same transmission timing as any one of the equal number of electromagnetic transmitters included in another one of the plurality of electromagnetic transmission units,
the focal portion is a focal point where the electromagnetic waves transmitted by the plurality of electromagnetic transmitters converge, and
the predetermined transmission duty cycle is a reciprocal of a number of the equal number of electromagnetic transmitters to be pulse-driven at different transmission timings.

2. An electromagnetic transmission device comprising:
a plurality of electromagnetic transmitters configured to emit electromagnetic waves onto a focal portion where an irradiation target is disposed, the electromagnetic waves being modulated by a repeating pulse with a predetermined transmission duty cycle, wherein
the focal portion is a focal point where the electromagnetic waves transmitted by the plurality of electromagnetic transmitters converge, and
each of the plurality of electromagnetic transmitters is configured to be pulse-driven to start and stop transmission at a different transmission timing, a time interval between adjacent transmission timings of the different transmission timings being a transmission time corresponding to the predetermined transmission duty cycle.

3. The electromagnetic transmission device according to claim 2, further comprising a control device configured to control the transmission timings of the plurality of electromagnetic transmitters, wherein
the control device is configured to delay the transmission timings of the plurality of electromagnetic transmitters sequentially by the transmission time corresponding to the predetermined transmission duty cycle.

4. The electromagnetic transmission device according to claim 2, further comprising a plurality of electromagnetic transmission units, wherein
each of the plurality of electromagnetic transmission units includes a respective set of the plurality of electromagnetic transmitters, and
any one of the plurality of electromagnetic transmitters included in one of the plurality of electromagnetic transmission units is configured to operate at the same transmission timing as any one of the plurality of electromagnetic transmitters included in another one of the plurality of electromagnetic transmission units.

5. The electromagnetic transmission device according to claim 2, wherein the predetermined transmission duty cycle is a reciprocal of a number of the electromagnetic transmitters to be pulse-driven at the different transmission timings.

6. A power amplification device for amplifying electromagnetic waves, the power amplification device comprising:
a plurality of power amplifiers configured to be pulse-driven repeatedly with a predetermined transmission duty cycle, to amplify electromagnetic waves, and to output the amplified electromagnetic waves to an electromagnetic transmitter, wherein
each of the plurality of power amplifiers is configured to be pulse-driven to start and stop amplification at a different transmission timing, a time interval between adjacent transmission timings of the different transmission timings being a transmission time corresponding to the predetermined transmission duty cycle,
the predetermined transmission duty cycle is a reciprocal of a number of the power amplifiers to be pulse-driven at the different transmission timings, and
the electromagnetic transmitter is configured to emit continuous electromagnetic waves onto an irradiation target.

7. An electromagnetic transmission system comprising:
the electromagnetic transmission device according to claim 1; and
an irradiation-target retainer configured to retain the irradiation target irradiated with electromagnetic waves emitted from the electromagnetic transmission device.

* * * * *